(12) United States Patent
Amadieu et al.

(10) Patent No.: US 11,276,094 B2
(45) Date of Patent: Mar. 15, 2022

(54) DEVICE, SYSTEM AND METHOD FOR INTERMEDIATION BETWEEN A PROVIDER SYSTEM THAT PROVIDES PROVIDER OBJECTS AND A CLIENT DEVICE

(71) Applicant: AMADEUS S.A.S., Biot Sophia Antipolis (FR)

(72) Inventors: Olivier Amadieu, Biot (FR); Fadi Akrimi, Biot (FR); Lorenzo Baldacchini, Biot (FR); Jean-Chafic Hays, Biot (FR); Corinne Francoise Pascale Landra, Biot (FR); Massimiliano Maini, Biot (FR); Rodolphe Texier, Biot (FR); Alexandra Imbert, Biot (FR)

(73) Assignee: AMADEUS S.A.S., Sophia Antipolis (FR)

( * ) Notice: Subject to any disclaimer, the term of this patent is extended or adjusted under 35 U.S.C. 154(b) by 402 days.

(21) Appl. No.: 16/656,768

(22) Filed: Oct. 18, 2019

(65) Prior Publication Data
US 2021/0118030 A1    Apr. 22, 2021

(51) Int. Cl.
*G06Q 30/06*    (2012.01)
*H04L 29/06*    (2006.01)

(52) U.S. Cl.
CPC ..... *G06Q 30/0619* (2013.01); *H04L 63/0428* (2013.01)

(58) Field of Classification Search
CPC .................. G06Q 30/0619; H04L 63/0428
USPC ............................................. 705/26.44, 26.4
See application file for complete search history.

(56) References Cited

U.S. PATENT DOCUMENTS

| | | | |
|---|---|---|---|
| 10,204,363 B2 * | 2/2019 | Rollins | G06Q 30/0601 |
| 11,086,822 B1 * | 8/2021 | Kraus | G06F 16/1744 |
| 2002/0032579 A1 * | 3/2002 | Harpale | G06Q 30/06 705/26.2 |

FOREIGN PATENT DOCUMENTS

| | | | | |
|---|---|---|---|---|
| FR | 3069076 A1 | 1/2019 | | |
| JP | 3630389 B2 * | 3/2016 | | H04N 7/173 |

OTHER PUBLICATIONS

Article, "Standards: Standards keep pace with carriers' needs" published May 2007 in Insurance Networking News: Executive Strategies for Technology Management, 10(10), 1., extracted from Dialog database on Dec. 17, 2021.*

* cited by examiner

*Primary Examiner* — Yogesh C Garg
(74) *Attorney, Agent, or Firm* — Perry + Currier, Inc.

(57) ABSTRACT

A server: receives from at least one provider system, at least one provider object that includes provider object data representing at least one item provided by the provider system(s); generates an intermediation object, corresponding to the at least one provider object, including an intermediation object identifier that identifies the intermediation object and intermediation object data populated with at least a subset of the provider object data, the intermediation object and the intermediation object identifier omitting: the provider object data, and any provider object identifier in an original form; and provides the intermediation object, in place of the at least one provider object, to a client device that requested the at least one item, the intermediation object provided. The intermediation object identifier may enable the server to intermediate between the client device and the provider system(s) without storing the provider object and/or any provider object identifier.

19 Claims, 13 Drawing Sheets

DEVICE, SYSTEM AND METHOD FOR INTERMEDIATION BETWEEN A PROVIDER SYSTEM THAT PROVIDES PROVIDER OBJECTS AND A CLIENT DEVICE

FIELD

The specification relates generally to intermediation between devices, and specifically to a device, system and method for intermediation between a provider system, that provides provider objects, and a client device.

BACKGROUND

The provision of various products, including for example travel-related goods and services (e.g. flights, hotel reservations, and the like) typically requires various discrete entities to exchange data defining various aspects of the products. Examples of such entities, in the context of travel-related products, include airlines, travel agencies, end users, reservation systems, and the like. Although such entities may be configured to exchange data according to a standardized format (e.g. according to the eXtensible Markup Language (XML)-based New Distribution Capability (NDC) standard in the context of travel-related products), they may nonetheless employ different mechanisms to initiate the exchange of data.

SUMMARY

An aspect of the specification provides a method comprising: receiving, at an intermediation server, from at least one provider system, at least one provider object that includes provider object data representing at least one item provided by the at least one provider system; generating, at the intermediation server, an intermediation object corresponding to the at least one provider object, the intermediation object including intermediation object data and an intermediation object identifier that identifies the intermediation object, the intermediation object data populated with at least a subset of the provider object data based on a mapping between the intermediation object data and the provider object data, the intermediation object and the intermediation object identifier omitting: the provider object data, and any provider object identifier, in an original form; and providing, by the intermediation server, the intermediation object to a client device that requested the at least one item provided by the at least one provider system, the intermediation object provided in place of the provider object.

Another aspect of the specification provides a server comprising: a communication interface; and a controller configured to: receive, via the communication interface, from at least one provider system, at least one provider object that includes provider object data representing at least one item provided by the at least one provider system; generate an intermediation object corresponding to the at least one provider object, the intermediation object including intermediation object data and an intermediation object identifier that identifies the intermediation object, the intermediation object data populated with at least a subset of the provider object data based on a mapping between the intermediation object data and the provider object data, the intermediation object and the intermediation object identifier omitting: the provider object data, and any provider object identifier, in an original form; and provide, via the communication interface, the intermediation object to a client device that requested the at least one item provided by the at least one provider system, the intermediation object provided in place of the provider object.

Another aspect of the specification provides a non-transitory computer-readable medium storing a computer program, wherein execution of the computer program is for: receiving, at an intermediation server, from at least one provider system, at least one provider object that includes provider object data representing at least one item provided by the at least one provider system; generating, at the intermediation server, an intermediation object corresponding to the at least one provider object, the intermediation object including intermediation object data and an intermediation object identifier that identifies the intermediation object, the intermediation object data populated with at least a subset of the provider object data based on a mapping between the intermediation object data and the provider object data, the intermediation object and the intermediation object identifier omitting: the provider object data, and any provider object identifier, in an original form; and providing, by the intermediation server, the intermediation object to a client device that requested the at least one item provided by the at least one provider system, the intermediation object provided in place of the provider object.

Another aspect of the specification provides a method comprising: receiving, at an intermediation server, from at least one provider system, at least one provider object that includes provider object data representing at least one item provided by the at least one provider system; generating, at the intermediation server, an intermediation object corresponding to the at least one provider object, the intermediation object comprising intermediation populated with at least a subset of the provider object data, the intermediation object omitting the provider object data, and any provider object identifier, in an original form; generating, at the intermediation server, an intermediate identifier from at least a portion of the provider object data arranged in a predetermined format; generating, at the intermediation server, an intermediation object identifier by encrypting the intermediate identifier; and providing, by the intermediation server, the intermediation object and the intermediation object identifier to a client device that requested the at least one item, without storing the intermediation object and the intermediation object identifier.

Another aspect of the specification provides a server comprising: a communication interface; and a controller configured to: receive, via the communication interface, from at least one provider system, at least one provider object that includes provider object data representing at least one item provided by the at least one provider system; generate an intermediation object corresponding to the at least one provider object, the intermediation object comprising intermediation populated with at least a subset of the provider object data, the intermediation object omitting the provider object data, and any provider object identifier, in an original form; generate an intermediate identifier from at least a portion of the provider object data arranged in a predetermined format; generate an intermediation object identifier by encrypting the intermediate identifier; and provide the intermediation object and the intermediation object identifier to a client device that requested the at least one item, without storing the intermediation object and the intermediation object identifier.

Another aspect of the specification provides a non-transitory computer-readable medium storing a computer program, wherein execution of the computer program is for: receiving, at an intermediation server, from at least one provider system, at least one provider object that includes provider object data representing at least one item provided by the at least one provider system; generating, at the intermediation server, an intermediation object corresponding to the at least one provider object, the intermediation object comprising intermediation object data populated with at least a subset of the provider object data, the intermediation object omitting the provider object data, and any provider object identifier, in an original form; generating, at the intermediation server, an intermediate identifier from at least a portion of the provider object data arranged in a predetermined format; generating, at the intermediation server, an intermediation object identifier by encrypting the intermediate identifier; and providing, by the intermediation server, the intermediation object and the intermediation object identifier to a client device that requested the at least one item, without storing the intermediation object and the intermediation object identifier.

BRIEF DESCRIPTIONS OF THE DRAWINGS

For a better understanding of the various examples described herein and to show more clearly how they may be carried into effect, reference will now be made, by way of example only, to the accompanying drawings in which.

DETAILED DESCRIPTION

Figure 1:
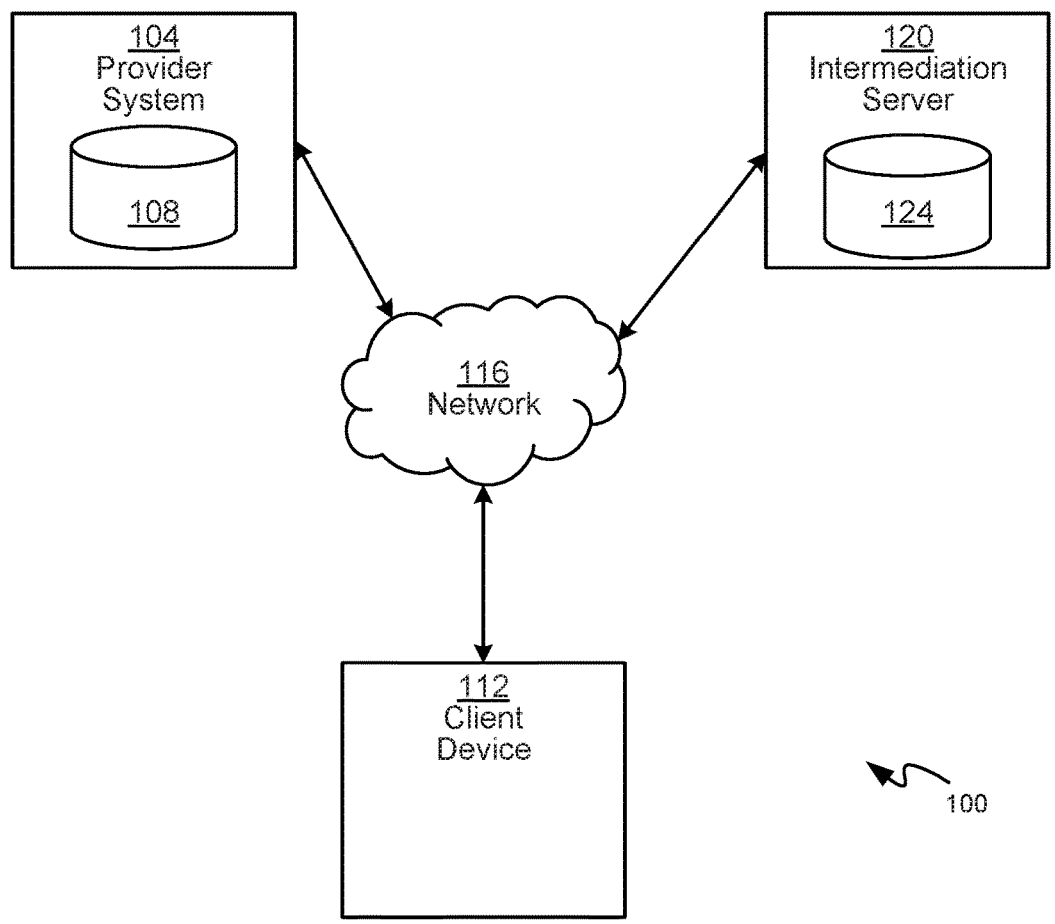
FIG. 1 depicts a system for intermediation between a provider system that provides provider objects and a client device, according to non-limiting examples.

FIG. 1 depicts a system 100 for intermediation between a provider system, that provides provider objects, and a client device. The provider objects, in the examples discussed herein, may comprise provider objects and/or data records which correspond to products and/or items, such as travel-related goods and services (e.g. flights, hotel reservations, car rentals and the like), provided by the provider system. More specifically, the products and/or items discussed in the examples below may be flight tickets and related services (e.g. baggage check services, in-flight food, entertainment and the like). However, as will be apparent to those skilled in the art, the systems and methods discussed below can also be applied to various other types of data objects and/or items.

Delivery of the items mentioned above is typically controlled by a provider entity, such as an airline in the case of the items discussed in connection with the examples provided herein. The system 100 includes one or more provider systems 104 and/or at least one provider system 104 (e.g. one or more servers or other suitable computing devices), which in this example is operated by one or more provider entities. The system 100 can include a plurality of provider systems 104, each operated by respective provider entities (e.g. other airlines), although only one provider system 104 is shown for illustrative purposes. In some examples, the provider system 104 may store a repository 108 containing a plurality of provider objects. The provider objects may be in any suitable format including, but not limited to Edifact recommendations in the context of Global Distribution System (GDS)-based data exchange, offer records in the context of New Distribution Capability (NDC)-based data exchange, and/or any other suitable format. Indeed, the provider objects may comprise data objects and/or data records, for example storing an Edifact recommendation or an NDC offer, and/or any other suitable data representing at least one item provided by the provider system 104. Furthermore, when the provider objects comprise NDC offers, the NDC offers may be stored at the repository 108; however, when the provider objects comprise Edifact recommendations, the Edifact recommendations may not be stored at the repository 108.

Each provider object defines an item, or a combination of items, which may be offered for purchase (e.g. by end users of the items) including, but not limited to one or more of flights, train rides, hotel stays, airport lounge access, seat upgrades, baggage check services, in-flight food, entertainment, and the like, and/or associated services. Thus, in the examples discussed below, each provider object may define a flight operated by the provider entity, and/or travel services associated with the flight. Each provider object therefore contains various fields. Certain fields define item attributes, such as product object identifiers (e.g. service identifiers, item identifiers, product identifiers and the like), locations, dates and times corresponding to the products (e.g. flight times and other itinerary data). The type of fields and/or data of a provider object may depend on a type of a provider object. For example, provider objects corresponding to flights may include flight identifiers, whereas provider objects corresponding to other travel-related items, such as an offer for accessing an airport lounge and/or an offer for a premium seat upgrade, may include information related to the lounge, the premium seat, etc.

Provider objects may be generated for storage in the repository 108 in response to requests received at the provider system 104 from other components of the system 100. For example, the requests may be received from a client device 112, via a network 116 (e.g. any suitable combination of local and wide area networks, including the Internet) and via an intermediation server 120. As will be described below, the intermediation server 120 generally intermediates between the client device 112 and the provider system 104, for example such that the client device 112 may request products from the provider system 104, and/or more than one provider system 104, via the intermediation server 120.

The client device 112, in the present example, may be operated by a travel agent entity, and therefore generates and transmits requests for provider objects (e.g. representing products which may be for purchase), and/or requests to purchase products (e.g. represented by the provider objects), to the provider system 104, via the intermediation server 120, on behalf of end users (e.g. travelers). The system 100 can include a plurality of client devices 112, although only one client device 112 is shown in FIG. 1 for illustrative purposes.

Various other mechanisms for initiating the creation of the provider objects are also contemplated. For example, end users (via additional computing devices not shown in FIG. 1) may initiate the creation of the provider objects via direct interaction with a website hosted by the intermediation server 120. Various mechanisms for the creation of provider objects in the repository 108 will be apparent to those skilled in the art, such as the "offer" and "order" mechanisms specified by the NDC standard. The creation of provider objects in response to product purchase requests is not discussed in further detail herein.

The client device 112 is configured to receive data contained in the provider objects stored in the repository 108 via the intermediation server 120. Data obtained by the client device 112, via the intermediation server 120, may be presented to users served by the client device 112; further information associated with the items represented by the provider objects may be requested by the client device 112 which may include, but is not limited to the client device 112 ordering the items. In other words, the system 100 enables the client device 112 to request further information associated with the items represented by the provider objects stored at the repository 108, via the intermediation server 120. The client device 112 may be configured to request the further information and/or initiate such orders by transmitting requests to the provider system 104 via the intermediation server 120.

The provider objects provided by the provider system 104 generally include provider object data representing at least one item provided by the provider system 104. In some examples, the provider object data may include a provider object identifier and/or provider object identifier data, that identifies the provider object to the provider system 104. The provider object data generally comprises information that identifies a travel related product and/or service. Whether the provider object data includes a specific provider object identifier, or not may depend on whether a provider object is being in an NDC or Edifact (e.g. GDS) format. For example, when a provider object comprises an NDC offer, the provider object identifier data may comprise an identifier generated by the provider system 104 which specifically identifies the NDC offer. However, when a provider object comprises an Edifact recommendation, which generally does not include a specific identifier, the Edifact recommendation may be identified by the provider system 104 based on provider object identifier data such as characteristics of the Edifact recommendation such as a specific attribute (e.g. an order in which data of a recommendation is presented) and/or format of data of the Edifact recommendation.

The intermediation server 120 maintains a local repository 124. In some examples, the local repository 124 may contains versions of the provider objects which are generated, at the intermediation server 120, for example when a provider object is received at the intermediation server 120. The versions of the provider objects generated by the intermediation server 120 are interchangeably referred to hereafter as intermediation objects.

In general, an intermediation object corresponds to at least one provider object. Furthermore, an intermediation object includes intermediation object data and an intermediation object identifier that identifies the intermediation object, the intermediation object data populated with at least a subset of the at least provider object data based on a mapping between the intermediation object data and the provider object data. Such a mapping may be stored at a memory of the intermediation server 120. In general, the intermediation object and the intermediation object identifier omit: the provider object data, and any provider object identifier, in an original form. For example, the intermediation object and the intermediation object identifier are generally configured such that a user of the client device 112, when they have access to the intermediation object and the intermediation object identifier, are unable to specifically identify the at least one provider object to the provider system 104. For example, the intermediation object and the intermediation object identifier may specifically exclude and/or omit a provider object identifier and/or provider object identifier data. However, the intermediation object and the intermediation object identifier are generally configured to enable the intermediation server 120 to identify the at least one provider object to the provider system 104 using, for example: one or more of the intermediation object and the intermediation object identifier being stored in association with one or more of the at least one provider object and the provider object identifier; and/or data encrypted in the intermediation object identifier.

The intermediation server 120 is further configured to provide the intermediation object to the client device 112 that requested the at least one item provided by the provider system, the intermediation object provided in place of the at least one provider object, as described in more detail below.

Figure 2:
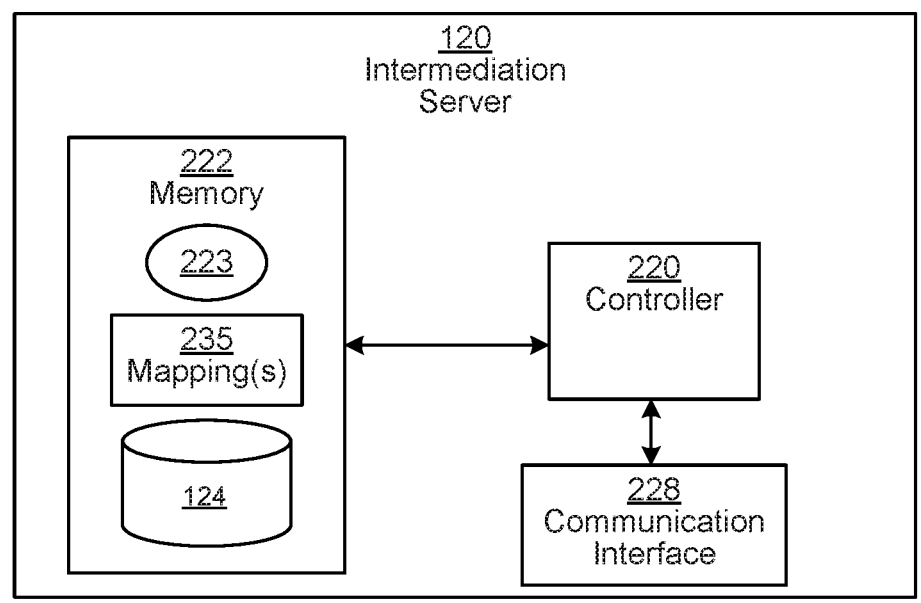
FIG. 2 depicts a device for intermediation between a provider system that provides provider objects and a client device, according to non-limiting examples.

Turning to FIG. 2, before discussing the functionality of the system 100 in greater detail, certain components of the intermediation server 120 will be discussed in greater detail. While depicted as one device, the intermediation server 120 may comprise one or more computing devices and/or one or more cloud computing devices that may be geographically distributed.

As shown in FIG. 2, the intermediation server 120 includes at least one controller 220, such as a central processing unit (CPU) or the like. The controller 220 is interconnected with a memory 222 storing an application 223, the memory 222 implemented as a suitable non-transitory computer-readable medium (e.g. a suitable combination of non-volatile and volatile memory subsystems including any one or more of Random Access Memory (RAM), read only memory (ROM), Electrically Erasable Programmable Read Only Memory (EEPROM), flash memory, magnetic computer storage, and the like). The controller 220 and the memory 222 are generally comprised of one or more integrated circuits (ICs).

The controller 220 is also interconnected with a communication interface 228, which enables the intermediation server 120 to communicate with the other computing devices of the system 100 (i.e. the provider system 104 and the client device 112) via the network 116. The communication interface 228 therefore includes any necessary components (e.g. network interface controllers (NICs), radio units, and the like) to communicate via the network 116. The specific components of the communication interface 228 are selected based on upon the nature of the network 116. The intermediation server 120 can also include input and output devices connected to the controller 220, such as keyboards, mice, displays, and the like (not shown).

The components of the intermediation server 120 mentioned above can be deployed in a single enclosure, or in a distributed format. In some examples, therefore, the intermediation server 120 includes a plurality of processors, either sharing the memory 222 and communication interface 228, or each having distinct associated memories and communication interfaces.

As depicted, the memory 222 may store the local repository 124 introduced in connection with FIG. 1. However, in other examples, the local repository 124 may be external to the intermediation server 120, and accessible to the controller 220, for example via the communication interface 228.

The memory 222 also stores a plurality of computer-readable programming instructions, executable by the controller 220, in the form of various applications, including the application 223. As will be understood by those skilled in the art, the controller 220 executes the instructions of the application 223 (and any other suitable applications) in order to perform various actions defined by the instructions contained therein. In the description below, the controller 220, and more generally the intermediation server 120, are said to be configured to perform those actions. It will be understood that they are so configured via the execution (by the controller 220) of the instructions of the applications stored in memory 222.

As depicted, the memory 222 further stores a mapping 235 between intermediation object data and provider object data. For example, the mapping 235 may indicate fields of intermediation objects that correspond to respective fields of the provider objects. For example, provider object data of a given type, such as a flight number, may be at a given field of a provider object; similarly, an intermediation object may include a respective given field where a flight number is to be stored. The mapping 235 may indicate a correspondence between such fields of the provider objects and the intermediation objects such that given fields of the intermediation objects may be populated with given data from corresponding fields of provider objects. In general, the mapping 235 is preconfigured at the memory 222. Put another way, the mapping 235 is generated assuming that the provider objects have a consistent (and/or same) format and/or provider objects of a given type have a consistent (and/or same) respective format.

Furthermore, while only one mapping 235 is depicted, the memory 222 may store different mappings 235 for different provider object formats and/or different provider object types. For example, while only one provider system 104 is described herein, the intermediation server 120 may be communicating with more than one provider system 104 (e.g. of different airlines), which may each generate and/or provide respective provider objects of different formats. Alternatively, a given provider system 104 may generate and/or provide provider objects having different formats for different types of items (e.g. flight offers, lounge offers, premium seat offers, and the like). In general, the memory 222 stores a respective mapping 235 for each type of provider object that may be received.

However, the intermediation objects that are generated may have a consistent and/or same format. Hence, via the mapping 235 (and/or mappings 235), the intermediation objects may be populated and provided to the client device 112 in a consistent and/or same format, regardless of the format and/or type of provider objects from which data is used to populate the intermediation objects.

Execution of the application 223, as will be discussed below, configures the intermediation server 120 to, in one mode: receive, from at least one provider system 104 (e.g. the provider system 104), at least one provider object that includes provider object data representing at least one item provided by the least one provider system; generate an intermediation object corresponding to the at least one provider object, the intermediation object including intermediation object data and an intermediation object identifier that identifies the intermediation object, the intermediation object data populated with at least a subset of the provider object data based on a mapping 235 between the intermediation object data and the provider object data, the intermediation object and the intermediation object identifier omitting: the provider object data, and any provider object identifier, in an original form; and provide the intermediation object to a client device (e.g. the client device 112) that requested the at least one item provided by the least one provider system, the intermediation object provided in place of the provider object.

While structure of the provider system 104 and the client device 112 is not described in detail, the provider system 104 and the client device 112 are understood to have a similar structure as the intermediation server 120, but adapted for the functionality of the provider system 104 and the client device 112.

Figure 3:
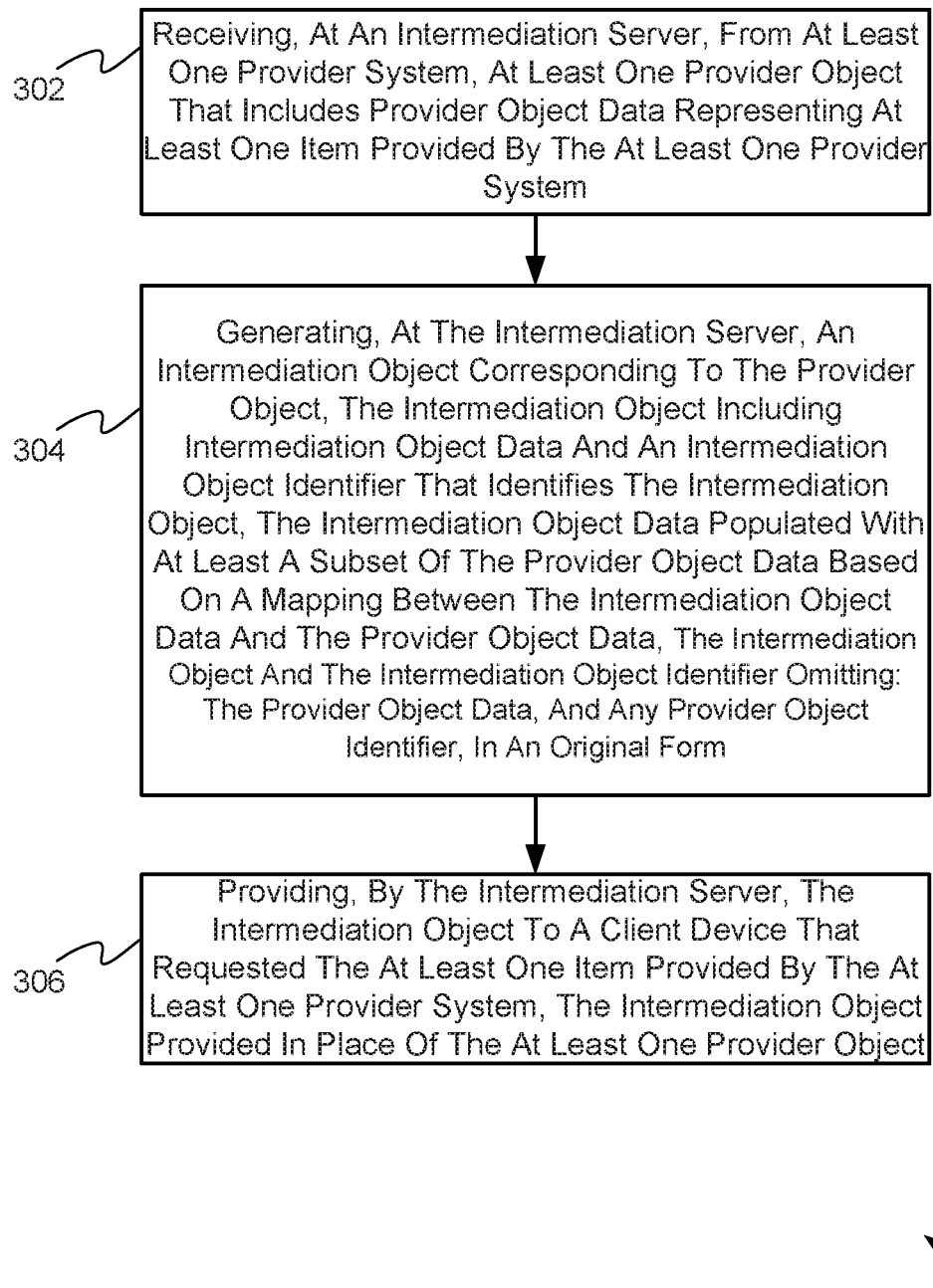
FIG. 3 depicts a method for intermediation between a provider system that provides provider objects and a client device, according to non-limiting examples.

Attention is now directed to FIG. 3 which depicts a flowchart representative of a method 300 for intermediation between a provider system that provides provider objects to a client device. The operations of the method 300 of FIG. 3 correspond to machine readable instructions that are executed by the intermediation server 120, and specifically the controller 220 of the intermediation server 120. In the illustrated example, the instructions represented by the blocks of FIG. 3 are stored at the memory 222 for example, as the application 223. The method 300 of FIG. 3 is one way in which the controller 220 and/or the intermediation server 120 and/or the system 100 may be configured. Furthermore, the following discussion of the method 300 of FIG. 3 will lead to a further understanding of the system 100, and its various components.

The method 300 of FIG. 3 need not be performed in the exact sequence as shown and likewise various blocks may be performed in parallel rather than in sequence. Accordingly, the elements of method 300 are referred to herein as "blocks" rather than "steps." The method 300 of FIG. 3 may be implemented on variations of the system 100 of FIG. 1, as well.

At a block 302, the controller 220 and/or the intermediation server 120 receives (e.g. via the communication interface 228), from the at least one provider system 104, a provider object that includes provider object data representing at least one item provided by the provider system. As described above, the provider object data may include a provider object identifier and/or provider object identifier data that identifies the provider object to the provider system. In some examples, the provider objects may be received as messages (e.g. in an eXtensible Markup Language (XML) format) associated with provider objects representing items provided by one or more provider systems 104. The messages may be associated with provider objects which may comprise NDC offers, or Edifact recommendations (e.g. according to GDS data exchange), and the like, and/or be in any suitable format; the format, etc. of the messages may hence depend on capability of the provider systems 104 and/or sources of the messages, and/or whether the provider systems 104 and/or sources of the messages are operating according to NDC or GDS based data exchange format, and/or another type of data exchange format. In general, NDC offers may include provider object identifiers while Edifact recommendations may not include provider object identifiers, though characteristics of an Edifact recommendation (e.g. a format thereof, and the like) may enable the Edifact recommendation to be identified by the provider system 104.

In some examples, at the block 302, the controller 220 and/or the intermediation server 120 may: receive, from the client device 112, a request for the at least one item provided by the provider system 104; request, from the provider system 104, the at least one provider object based on the request received from the client device 112; and receive, from the provider system 104, the at least one provider object. Hence, in these examples, the least one provider object is received in response to a request from the client device 112 received at the intermediation server 120; in particular, the request may be for an offer for flights to given locations on particular days, and the intermediation server 120 may request, from the provider system 104, an offer for such flights. The least one provider object returned to the intermediation server 120, from the provider system 104, may comprise an offer for such flights, and the offer may include other items, such as an offer for lounge access, an offer for premium seat upgrade, and the like.

However, in other examples, a component of the system 100, such as a traffic generator, which may be a component of the intermediation server 120 and/or a separate component, and the like, may automatically and/or periodically request provider objects from one or more provider systems 104 via messages, for example to have a record of offers for flights to given locations on particular days. Such requests may be transmitted and/or triggered by the intermediation server 120, and the resulting provider objects and/or messages may be stored in a cache and used to later respond to a request from the client device 112 for such flights without, again, requesting the offer from the provider system 104. Such a system is described in Applicant's co-pending application titled "DEVICE, SYSTEM AND METHOD FOR PROVIDING PROVIDER OBJECTS FROM A CACHE", filed on a same day as the present specification, and incorporated herein by reference.

At a block 304, the controller 220 and/or the intermediation server 120 generates an intermediation object corresponding to the least one provider object, the intermediation object including intermediation object data and an intermediation object identifier that identifies the intermediation object, the intermediation object data populated with at least a subset of the provider object data based on a mapping 235 between the intermediation object data and the provider object data, the intermediation object and the intermediation object identifier omitting: the provider object data, and any provider object identifier, in an original form.

In some examples, a provider object may comprise one or more of a provider offer item and a provider service item representing a plurality of items provided by the provider system, and the intermediation object generated may comprise one or more of an intermediation offer item and an intermediation service item respectively corresponding to one or more of the provider offer item and the provider service item. For example, a provider service item may comprise data indicative of services provided by the provider system 104, such as flights, lounge access, etc.; a provider offer item may comprise the provider services items, but with cost information bundled therewith, and/or a provider offer item may comprise a plurality of provider services items bundled together with a given price. However, NDC offers may include both provider service items and provider offer items, whereas Edifact recommendations may include provider service items but not provider offer items (which may be particular to the NDC format); as such the structure of the provider object may depend on whether the provider system 104 is operating according to NDC or GDS based data exchange.

Similarly, the intermediation object generated may comprise one or more of an intermediation offer item and an intermediation service item respectively corresponding to one or more of the provider offer item and the provider service item. Furthermore, an intermediation object may be generated from more than one provider object, as described in more detail below.

Furthermore, the intermediation object identifier may be generated in any suitable manner such that the intermediation object identifier may be used to identify and/or uniquely identify the intermediation object to the intermediation server 120. In some examples, the intermediation server 120 may assign and/or uniquely assign the intermediation object identifier to the intermediation object. In other examples, as described below, the intermediation server 120 may encrypt a portion of the provider object data to obtain the intermediation object identifier which may, or may not, include a provider object identifier depending, for example, on whether or not the at least one provider object includes an NDC offer or an Edifact recommendation.

Hence, the intermediation object, and the intermediation object identifier do not include the provider object data, and any provider object identifier, in an original form, though the intermediation object contains data from the provider object data according to the mapping. Put another way, the intermediation object includes data from the provider object data, but restructured (e.g. according to the mapping) to prevent the client device 112 from identifying the provider objects to the provider system 104 and/or restructured in a manner that impedes the ability of the client device 112 from communicating with the provider system 104 directly regarding the at least one provider object 104, for example to reduce load on the provider system 104; as will be described below in real-world travel industry environments millions to billions of requests per day may be generated that represent searches for items provided by provider systems 104 and the intermediation server 120 generally intermediates between the client device 112 and the provider system 104 to control and/or reduce load on the provider system 104. Regardless, the intermediation server 120 is generally configured to determine that an intermediation object is associated with at least one provider object.

For example, the controller 220 and/or the intermediation server 120 may store, at one or more memories (e.g. the memory 222 and/or an external memory accessible to the controller 220 and/or the intermediation server 120), one or more of the intermediation object and the intermediation object identifier in association with one or more of the at least one provider object and the provider object identifier. Hence, when communications regarding the intermediation object are received, (for example by the client device 112 requesting further information associated with the at least one item), the communications including the intermediation object identifier, and the like, the controller 220 and/or the intermediation server 120 may determine the associated provider object via the stored association between one or more of the intermediation object and the intermediation object identifier, and the one or more of the at least one provider object and the provider object identifier.

In other examples, the controller 220 and/or the intermediation server 120 may including an encrypted version of a portion of the at least one provider object at the intermediation object, for example at a given field of the intermediation object. Hence, in these examples, the client device 112 may include, for example, in a request for further information associated with the at least one item indicated by the at least one provider object, the encrypted version of the portion of the at least one provider object such that the intermediation server 120 may decrypt the encrypted version to obtain the at least one provider object. In such examples, it is understood that the intermediation server 120, but not the client device 112, has access to cryptographic keys, and the like, for encrypting and/or decrypting the at least one provider object. While encryption and decryption are not described in detail herein, any suitable process for encrypting and/or decrypting the provider object is within the scope of the present specification. Furthermore, as will be described in more detail below, in some examples, encryption techniques may be used to obviate storage of provider objects, intermediation objects, provider object identifiers and/or intermediation object identifiers at the repository 124.

At a block 306, the controller 220 and/or the intermediation server 120 provides (e.g. via the communication interface 228) the intermediation object to the client device 112 that requested the at least one item provided by the at least one provider system 104, the intermediation object provided in place of the at least one provider object.

In some examples, the controller 220 and/or the intermediation server 120 may receive, from the client device 112, a request including the intermediation object identifier. The request may be for further information associated with the at least one item represented by the at least one provider object associated with the intermediation object transmitted to the client device 112. In some examples the further information associated with the at least one item, of the request, may be to order the at least one provider object (e.g. in NDC data exchange, an "Order Create" request) and/or may represent an intermediate step in ordering the provider object (e.g. the request may be for a finalized price object (e.g. in NDC data exchange, an "Offer Price" request) and/or itinerary, and the like, for the at least one provider object). In these examples, the controller 220 and/or the intermediation server 120 may request the further information for the at least one item, from the provider system 104, based on the at least one provider object and/or a provider object identifier and/or provider object identifier data as determined from the intermediation object identifier and one or more of: at least one of the intermediation object and the intermediation object identifier stored, at one or memories, in association with one or more of the at least one provider object and the provider object identifier; and an encrypted version of a portion of the at least one provider object included at the intermediation object. Such examples are described above.

In some examples, the controller 220 and/or the intermediation server 120 may request further information associated with the at least one item, from the provider system 104, in response to the request. However, in other examples, the request for the further information associated with the at least one item may be an intermediate step before ordering the at least one item, and ordering the at least one item may occur in response to another request received from the client device 112.

While the method 300 has been described with respect to at least one provider object and/or one provider system 104, the method 300 may be adapted for more than one provider object and/or more than one provider system 104.

For example, the controller 220 and/or the intermediation server 120 may, at the block 302, receive (e.g. from one or more provider system 104) a plurality of provider objects. Each of the provider objects received may include a respective provider object identifier and/or respective provider object identifier data, as described above. The controller 220 and/or the intermediation server 120 may, in these examples, populate, at the block 304, the intermediation object data of the intermediation object, with at least a subset of respective provider object data of the plurality of provider objects based on one or more mappings 235 between the intermediation object data and the respective provider object data, the intermediation object and the intermediation object identifier omitting: the respective provider object data, including any respective provider object identifiers, in a respective original form. Again, the intermediation object generally includes least a subset of respective provider object data, but restructured to prevent the client device 112 from identifying the provider objects to the provider system 104.

Hence, for example, when more than one provider object is received at the intermediation server 120, for example, with different formats, and (e.g. in the case of NDC offers) provider object identifiers and/or provider object identifier data (e.g. in the case of Edifact recommendations), the intermediation server 120 generally translates the provider objects to a common intermediation format, for example generating respective intermediation objects, and identifies the intermediation objects with intermediation object identifiers. Such examples bring homogeneity to communications between the client device 112 and the provider systems 104, which may make communication therebetween more efficient; for example, travel services and/or computing resources implemented at the client device 112 need not be adapted to many provider object formats. Indeed, in response to a request from the client device 112, the intermediation server 120 may generally respond with tens to hundreds to thousands of intermediation objects, each of which may correspond to a provider object received from one or more provider systems 104; hence the number of formats, and the like, of the provider objects may be very large. Rather than adapting travel services and/or computing resources implemented at the client device 112 for processing such a large number of formats, such travel services and/or computing resources implemented at the client device 112 may be adapted for the common intermediation format, which may lead to more efficient use of processing resources at the client device 112. Similarly, the intermediation object identifiers may also be a in common format, which may also lead to more efficient use of processing resources at the client device 112, as the travel services and/or computing resources implemented at the client device 112 need not be adapted for many different provider object identifier and/or provider object identifier data types.

Furthermore, the intermediation object may include both NDC offers and Edifact recommendations (e.g. the provider objects from which the intermediation object is generated may be of different formats) for example from different provider systems 104. Each of the NDC offers and Edifact recommendations may be in different formats, and furthermore such formats may be particular for a given provider system, such as associated NDC offer identifiers and/or characteristics of an Edifact recommendation. When such NDC offers and/or Edifact recommendations are provided to the client device 112 in as-generated formats, the client device 112 (e.g. travel services and/or computing resources and/or processing resources thereof) may be adapted for each different format of NDC offers and/or Edifact recommendations that may be received at the client device 112. The functionality of the intermediation server 120 may generally obviate such a problem.

Furthermore, in some examples, the intermediation server 120 may combine two or more provider objects into one intermediation object, (e.g. combine two or more NDC offers, combine two or more Edifact recommendations, and/or combine at least one NFC offer and at least one Efifact recommendations); furthermore the two or more provider objects combined into one intermediation object may be from one or more provider systems 104. In such examples, one intermediation object may be generated, and one intermediation object identifier may be generated for the one intermediation object generated from the combination of the two or more provider objects. The repository 124 may store associations between one or more of the intermediation object and the intermediation object identifier in association with one or more of the combined provider objects and provider object identifiers of the combined provider objects.

Figure 4:
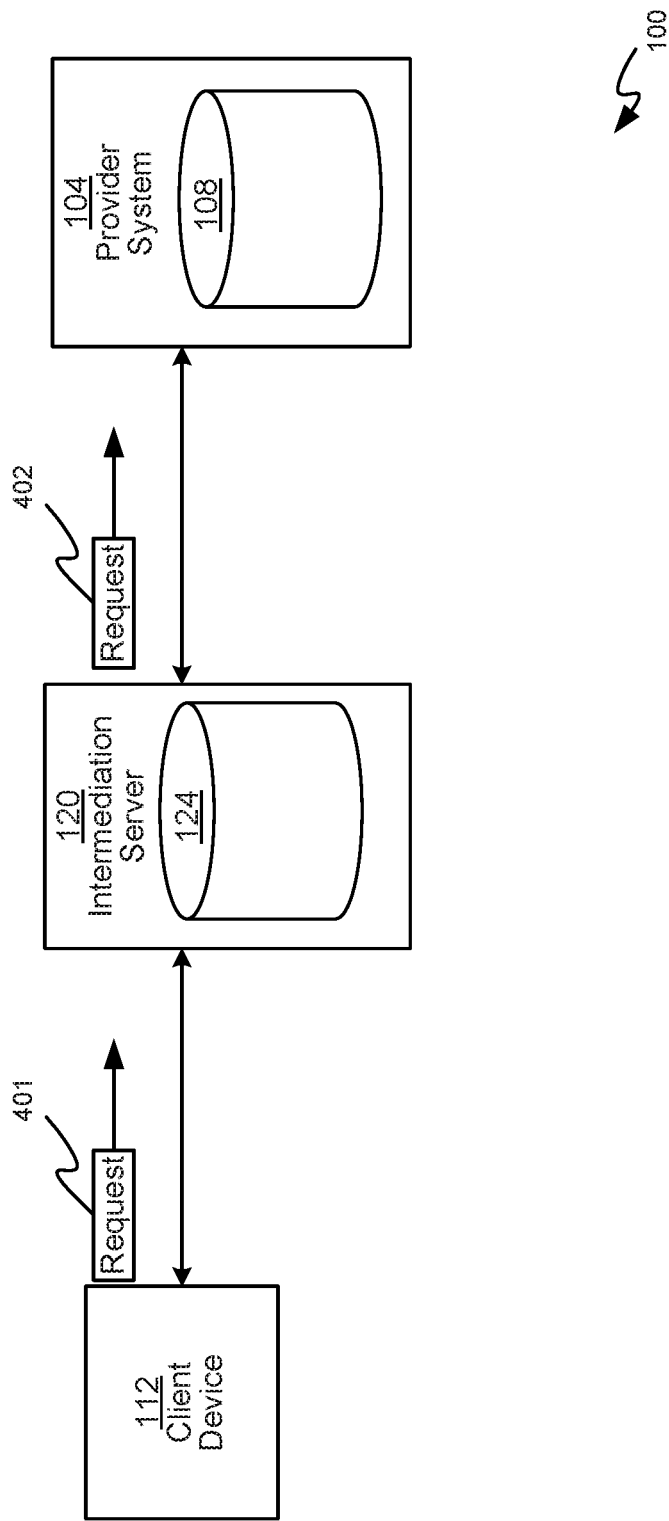
FIG. 4 depicts the client device of the system of FIG. 1 transmitting a request, according to non-limiting examples.
Figure 5:
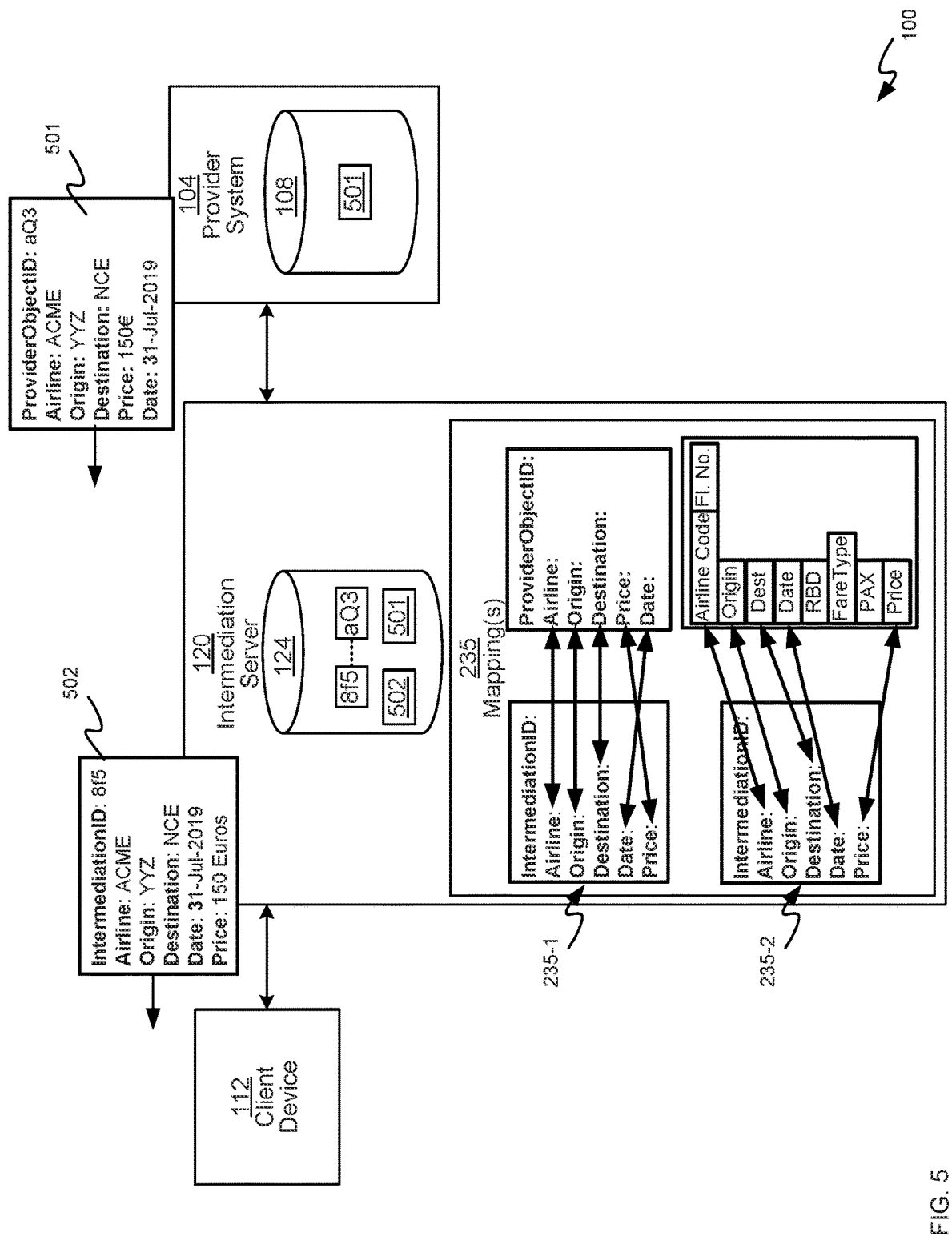
FIG. 5 depicts the intermediation server of the system of FIG. 1 providing an intermediation object to the client device, according to non-limiting examples.

Attention is next directed to FIG. 4 and FIG. 5 which depicts an example of the method 300. Each of FIG. 4 and FIG. 5 depict the system 100, but without the network 116. Rather FIG. 4 and FIG. 5 show communication links between the components of the system 100 which are represented as double ended-arrows therebetween; such communication links may include the network 116. Otherwise, FIG. 4 and FIG. 5 are similar to FIG. 1, with like components having like numbers.

With attention first directed to FIG. 4, the client device 112 generates and transmits a request 401 to the intermediation server 120. The request 401 may represent a search for items provided by the provider system 104, such as flights between an originating location and a destination location on a particular date, and the like. In an example herein, the request 401 may represent a search for flights from Toronto, Canada (e.g. having airport code "YYZ") to Nice, France (e.g. having airport code "NCE") on the date Jul. 31, 2019. The intermediation server 120 receives the request 401 and generates a request 402 for provider objects that represent the items defined by the request 401. The request 402 may be in a same format as the request 401, or a different format. For example, the request 402 may be in a different format that is particular to the provider system 104.

Attention is next directed to FIG. 5 in which the provider system 104 responds to the request 402 by transmitting a provider object 501 to the intermediation server 120. The provider object 501 may be one of a plurality of provider objects transmitted by the provider system 104, each representing different available items (e.g. flights) that correspond to the search represented by the request 401.

As depicted, the provider object 501 includes provider object data in a structured format that includes provider object data (representing a flight) populating various fields. As depicted, the fields are delimited with colons (e.g. ":") though, when the provider object 501 comprises an NDC offer the fields may be delimited using brackets (e.g. "<" and ">"); however the fields may be delimited in any suitable manner. As depicted, the provider object 501 represents a flight (e.g. an item provided by the provider system 104) from Toronto (e.g. the field "Origin") to Nice (e.g. the field "Destination") operated by an airline named "ACME" (e.g. the field "Airline") on Jul. 31, 2019 (e.g. the field "Date") and with a Price of" (e.g. the field "Price"). The provider object 501 further includes a field "ProviderObjectID" which includes a provider object identifier "aQ3". While the provider object 501 is depicted with certain fields and/or in a certain format, the provider object 501 may include any suitable fields and/or be in any suitable format. As depicted, the provider object 501 is stored at the repository 108 at the provider system 104. It is further understood that further information associated with the item represented by the provider object 501 (which may include, but is not limited to ordering and/or booking and/or purchasing the at least one item) may occur via the provider object identifier "aQ3". In particular, the provider object 501 may comprise an NDC offer and hence the provider object identifier "aQ3" may comprise a specific identifier of the NDC offer generated by the provider system 104 which identifies and/or uniquely identifies the NDC offer to the provider system 104.

Hence, in FIG. 5, the intermediation server 120 receives (e.g. at the block 302 of the method 300) the provider object 501 and generates (e.g. at the block 304 of the method 300) an intermediation object 502 including intermediation object data (described below) and an intermediation object identifier, that identifies the intermediation object 502, the intermediation object data populated with at least a subset of the provider object data of the provider object 501, based on a mapping 235-1 between the intermediation object data (e.g. a format and/or structure of which is shown on the left-hand side of the mapping 235-1) and the provider object data (e.g. a format and/or structure of which is shown on the right-hand side of the mapping 235-1), the intermediation object 502 omitting the provider object data and the provider object identifier in an original form and/or structure. While the intermediation object 502 is depicted in a certain format, intermediation object 502 may be in an eXtensible Markup Language (XML) format. Hence, the mapping 235-1 may be for NDC offers generated by a particular provider system 104 operating according to NDC data exchange. As depicted a second mapping 235-2 is stored at the intermediation server 120 which may be for Edifact recommendations generated by a particular provider system 104 operating according to GDS data exchange.

As depicted, the intermediation object 502 includes fields "IntermediationID", "Airline", "Origin", "Destination", "Date" and "Price". The depicted mapping 235-1, maps the field "Airline" of the intermediation object 502 to the field "Airline" of the provider object 501, as graphically represented by an arrow therebetween (different from the arrows of the communication links). Similar mappings of the other fields of the intermediation object 502 to corresponding fields of the provider object 501 are depicted, other than the fields of the respective object identifiers. In particular, the fields "Date" and "Price" for each of the objects 501, 502 have different positions in the objects 501, 502; for example in the intermediation object 502, the positions of the fields "Date" and "Price" are reversed as compared to the provider object 501. Furthermore, the format of the field "Price" in the objects 501, 502 is different; in the provider object 501, a currency symbol (e.g. "€") i used while in the intermediation object 502, a name of the currency (e.g. "Euro") is used. Hence, the intermediation object 502 includes provider object data from the provider object 501, but in a different format and/or structure and further omits the provider object identifier. While such an example is relatively simplistic, it is understood that the format and/or structure differences between the objects 501, 502 may be much more complex. For example dates, times, airline names, etc. may be in different formats, and the mapping 235-1 may include data for translating the provider object data into a common format of the intermediation object data.

Furthermore, as depicted, the fields of the intermediation object 502 are populated with the provider data from the corresponding fields of the provider object 501, as identified via the mapping 235-1. While present examples are described with respect to all the provider data being mapped to the intermediation object 502, in other examples, some of the provider data may be omitted from the intermediation object 502 (e.g. provider data that may be particular to internal services of the provider system 104).

Furthermore, the intermediation object 502 is populated by an intermediation object identifier "8f5" at the field "IntermediationID", which is provided in place of the provider object identifier (e.g. the ProviderObjectID) "aQ3". In some examples, which will be described in more detail below, the intermediation object identifier "8f5" may be generated by encrypting the provider object data and/or the provider object identifier; for example, the intermediation object identifier "8f5" may be generated by encrypting one or more of the provider object data and the ProviderObjectID "aQ3" (and/or provider object identifier data). Hence, in some examples, the intermediation object identifier may comprise an encrypted version of a portion of the provider object, as described above.

As depicted, the intermediation object identifier "8f5" is stored at the repository 124 in association with the provider object identifier data "aQ3", as represented by a dashed line therebetween. However, when the intermediation object identifier "8f5" is generated by encrypting the ProviderObjectID "aQ3" (and/or provider object identifier data) the ProviderObjectID "aQ3" (and/or provider object identifier data) may not be stored at the repository 124 as the ProviderObjectID "aQ3" (and/or provider object identifier data) may be obtained by decrypting the intermediation object identifier "8f5". As depicted, the objects 501, 502 may also be stored at the repository 124.

The intermediation server 120 transmits (e.g. at the block 306 of the method 300) the intermediation object 502 to the client device 112, which receives the intermediation object 502 for processing, and the like. While not depicted, the client device 112 may request further information associated with the provider object 501, such as an finalized price and/or finalized information for the flight, and the like, for example by transmitting another request to the intermediation server 120 that includes the intermediation object identifier "8f5" as extracted from the field "IntermediationID". The intermediation server 120 may than retrieve the provider object identifier, and the like, "aQ3" from the repository based on the association between the object identifiers (and/or by decrypting the intermediation object identifier "8f5") and request a final price and/or finalized information for the flight, and the like, from the provider system 104, which may return the requested information, for example as an updated and/or new provider object (which may have the same provider object identifier "aQ3", however, in NDC data exchange, the updated and/or new provider object generally as a different provider object identifier), and the like; the intermediation server 120 may again translate the updated provider object into an updated intermediation object as described above. Alternatively, the requested information may be exchanged in any suitable format using the object identifiers, with the intermediation server 120 intermediating such an exchange of information using the object identifiers as stored at the repository 124. A request to purchase the item represented by the provider object 501 may proceed in a similar manner.

As depicted the intermediation server 120 stores a second mapping 235-2 between the intermediation object data (e.g. a format of which is shown on the left-hand side of the mapping 235-2) and provider object data which may be for Edifact recommendations (e.g. a format of which is shown on the right-hand side of the mapping 235-2). The depicted mapping 235-2 shows that Edifact recommendations have a different format and/or structure than NDC offers (e.g. the mappings 235-1, 235-2 have different formats and/or structures). For example, the fields of the Edifact recommendation may be in a different format than an NDC offer and not strictly delimited; rather the fields are indicated by a textual order of the fields, as represented by the format of an Edifact recommendation shown on the right-hand side of the mapping 235-2 being in the form of boxes rather than an ordered/character delimited list as in the mapping 235-1. A further example of an Edifact recommendation is described below with respect to FIG. 6. Furthermore, the depicted mapping 235-2 shows that Edifact Offers do not include an explicit provider object identifier.

The depicted mapping 235-2, maps the field "Airline" of an intermediation object to a field "Airline Code" of an Edifact recommendation, as graphically represented by an arrow therebetween. Similar mappings of the other fields of intermediation objects to corresponding fields of Edifact recommendations are depicted. As depicted, not all the fields of the Edifact recommendation may be mapped to the intermediation object data; for example an RBD (e.g. Reservation Booking Designator) code is not mapped and neither is a fare type.

Figure 6:
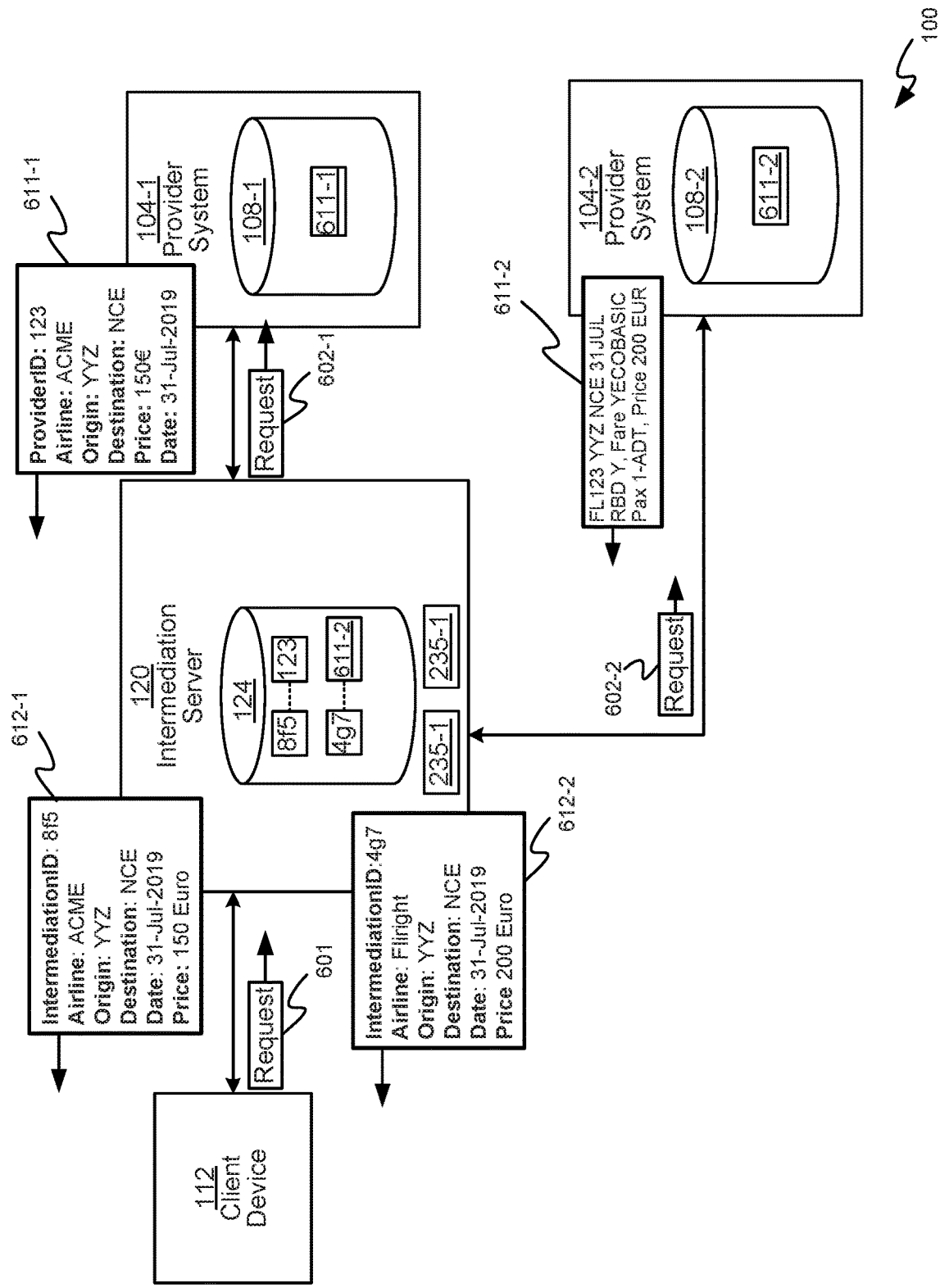
FIG. 6 depicts the intermediation server of the system of FIG. 1 providing more than one intermediation object to the client device, according to non-limiting examples.

Attention is next directed to FIG. 6 which depicts another example of the method 300. However, in FIG. 6, the intermediation server 120 is in communication with two provider systems 104-1, 104-2. The provider system 104-1 may be the same provider system 104 as that depicted in FIG. 1, FIG. 4 and FIG. 5, that provides provider objects in an NDC format; however, as described below, the provider system 104-1 may provide provider objects in an Edifact (e.g. GDS) format.

In FIG. 6, the client device 112 transmits a request 601 to the intermediation server 120 which may represent a search for the same items represented by the request 401. The intermediation server 120 receives the request 601 and responsively generates and transmits respective requests 602-1, 602-2 for the items to the provider systems 104-1, 104-2, the respective requests 602-1, 602-2 formatted for the particular provider system 104 to which the requests 602-1, 602-1 are transmitted.

As depicted, the provider system 104-1 transmits a provider object 611-1 that has a same format/structure, and provider object data, as that of the provider object 501 (e.g. an NDC format). However, the provider system 104-2 transmits a provider object 611-2 having a different format (e.g. an Edifact (e.g. GDS) format) than the provider object 611-1. For example, fields for the origin, destination, airline, time and are in different locations, have different names and are in different formats. Furthermore, the provider objects 611-1, 611-2 are differently structured; for example, the provider object 611-1 is in the form of an ordered, character delimited list, with field identifiers naming the fields; however the provider object 611-2 is in a text format with field identifiers for some fields and not for others, and a field being identifiable by a textual order of the fields (e.g. first text is a flight number second text (separated from the first text by a space) is an origin, etc.). However, the provider objects 611-1, 611-2 depicted are understood to be examples only; for example, NDC offers (e.g. the provider object 611-1) may comprise an XML format (e.g., a field identifier may be delimited by brackets, such as "<Airline>", and the like).

As depicted, an identifier of an airline of the provider object 611-1 is in a field "Airline", and represented by a name of the airline "ACME". However, an identifier (e.g. "FL") of an airline of the provider object 611-2 is in a first text position and embedded in a flight number "FL123Similarly, the price in the provider object 611-1 is represented in a format where the currency type (e.g. Euros) is presented in a symbolic format ("€"), while the price in the provider object 611-2 is represented in a text format (e.g. "Euro"). Regardless, each of the provider objects 611-1, 611-2, represent a different respective flight from Toronto to Nice on Jul. 31, 2019, provided by different airlines.

As described above, the intermediation server 120 stores the mappings 235-1, 235-2 between each of the provider objects 611-1, 611-2 and intermediation objects 612-1, 612-2. Hence, the intermediation server 120 generates respective corresponding intermediation objects 612-1, 612-2 having a same format, and identified using different respective intermediation object identifiers (e.g. "8f5" identifies the intermediation object 612-1 and "4g7" identifies the intermediation object 612-2), but having a similar format (e.g. number-letter-number). Generation of the intermediation object identifiers may occur in any suitable manner and is described in more detail below.

Hence, the intermediation server 120 translates the respective provider object data of the provider objects 611-1, 611-2 into respective common formats of the intermediation object data (e.g. an airline identifier of the provider object 611-2 is translated into an airport name (e.g. "FL" is translated to "Fliright") and a currency type of the provider object 611-1 is translated into a currency name (e.g. the Euro symbol € is translated to the word "Euro"), and the like). The provider objects 611-1, 611-2 are transmitted to the client device 112. Furthermore, associations between the respective intermediation object identifiers and various data of the provider objects 611 are stored at the repository 124 (e.g. the intermediation object identifier "8f5" is stored at the repository 124 in association with the provider object identifier data "aQ3", and the intermediation object identifier "4f7" is stored at the repository 124 in association with the provider object 611-2. While not depicted, the provider objects 611-1 and the intermediation objects 612-1, 612-2 may also be stored at the repository 124 (e.g. similar to as depicted in FIG. 5 with respect to the objects 501, 502).

While the intermediation objects 612 described heretofore are depicted having a given format for a single one-way flight, the intermediation objects 612 may have any suitable format and/or have any suitable structure; however the format of the intermediation objects 612 is a common format.

Figure 7:
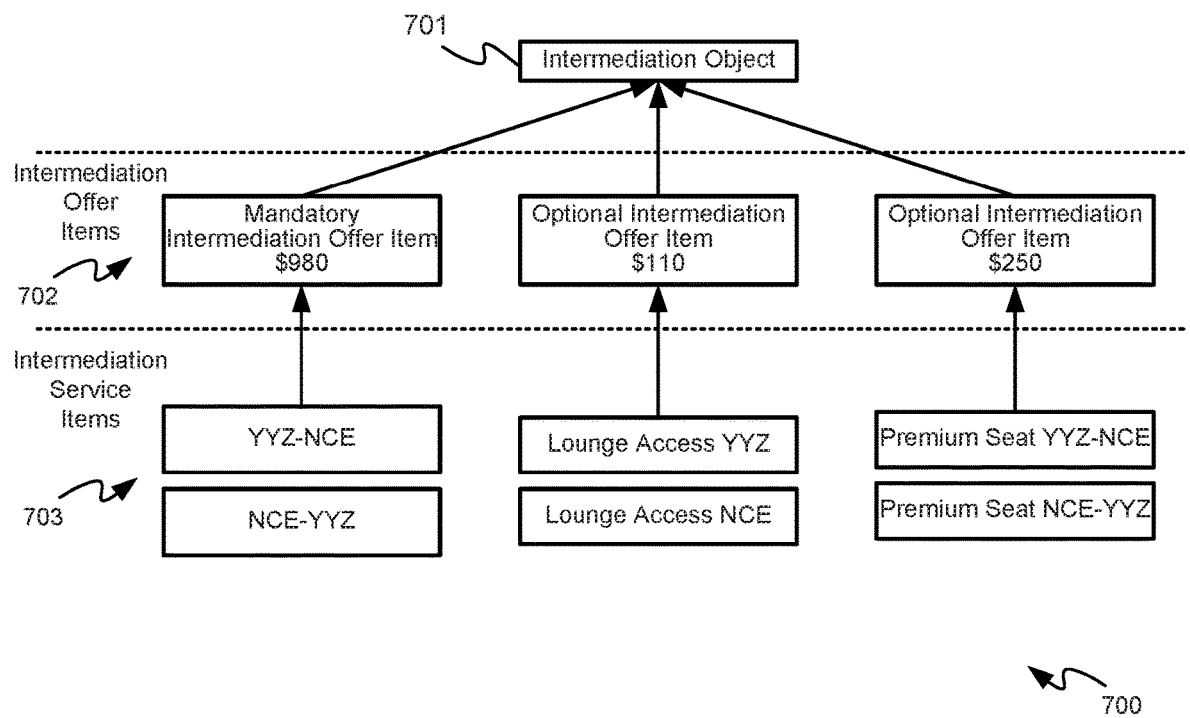
FIG. 7 depicts an example of a structure of an intermediation object, according to non-limiting examples.

Attention is next directed to FIG. 7 which depicts an example structure 700 of an example intermediation object 701. The intermediation object 701 may represent a return flight from Toronto to Nice, and may be generated from a provider object which was generated in response to a request for such a return flight. While not depicted the intermediation object 701 includes an intermediation object identifier as described above. Furthermore, while the structure 700 is depicted graphically, it is understood that the example intermediation object 701 may be in an XML format.

In particular, the intermediation object 701 may comprise one or more intermediation offer items 702, which may comprise respective intermediation service items 703. The intermediation service items 703 may each represent an individual item offered by a provider system 104. As depicted, the intermediation service items 703 may represent a one-way flight from Toronto to Nice (e.g. YYZ-NCE) combined with a one-way flight from Nice to Toronto (NCE-YYZ) for a total cost of $980, and the intermediation service items 703 representing the flight may be mandatory. However, the intermediation service items 703 may further represent: an offer for lounge access in Toronto combined with an offer for lounge access in Nice, for a total cost of $110; and offer for a premium seat on the flight from Toronto to Nice combined with an offer for a premium seat on the flight from Nice to Toronto, for a cost of $250, and; such services may be optional. For example, the optional services may represent services which may be optionally purchased when the mandatory services are purchased. Each of the intermediation service items 703 hence represent a different respective item (e.g. a service) provided by a provider system 104.

The intermediation service items 703 may be combined into the intermediation offer items 702. For example, as depicted, the one-way flights are combined into a mandatory intermediation offer item (e.g. a return flight from Toronto to Nice) for $980; in other examples, the one-way flights may be offered separately at respective prices. Similarly, the lounge access in Toronto and Nice may be combined into an optional offer item for $110; in other examples, the lounge access in Toronto and Nice may be offered separately at respective prices. Similarly, the premium seat from Toronto to Nice, and the premium seat from Nice to Toronto, may be combined into an optional offer item for $250; in other examples, the premium seats for each one-way flight may be offered separately at respective prices. Hence, if a request to purchase items represented by the intermediation object 701 is received, the request may include a request to purchase the mandatory bundled offer items 702 and optionally a request to purchase one or more of the optional bundled offer items 702. In particular, various individual intermediation service items 703 may not be purchased individually.

The example structure 700 of the example intermediation object 701 may be particular for NDC-based provider objects from which the example intermediation object 701 is generated, as NDC-based provider objects include provider offer items, corresponding to the intermediation offer items 702, and provider offer services, corresponding to the intermediation service items 703.

However, when a provider object from which an intermediation object is generated has an Edifact recommendation format, the intermediation object may not include intermediation offer item layer, as Edifact recommendations do not include provider offer items.

In real-world travel industry environments millions to billions of requests per day may be generated that represent searches for items provided by provider systems 104. For each request/search hundreds of responses may be generated; hence, tens to hundreds of billions intermediation objects may be generated by the intermediation server 120 every day, with only a small fraction of such intermediation objects resulting in an order for an item (e.g. a flight) provided by a provider system 104. In examples described heretofore, the intermediation object identifiers may be stored by the intermediation server 120; however with potentially hundreds of billions intermediation objects every day, storing information associated with each, as described with respect to FIG. 6, may place an undue storage burden on the intermediation server 120.

Figure 8:
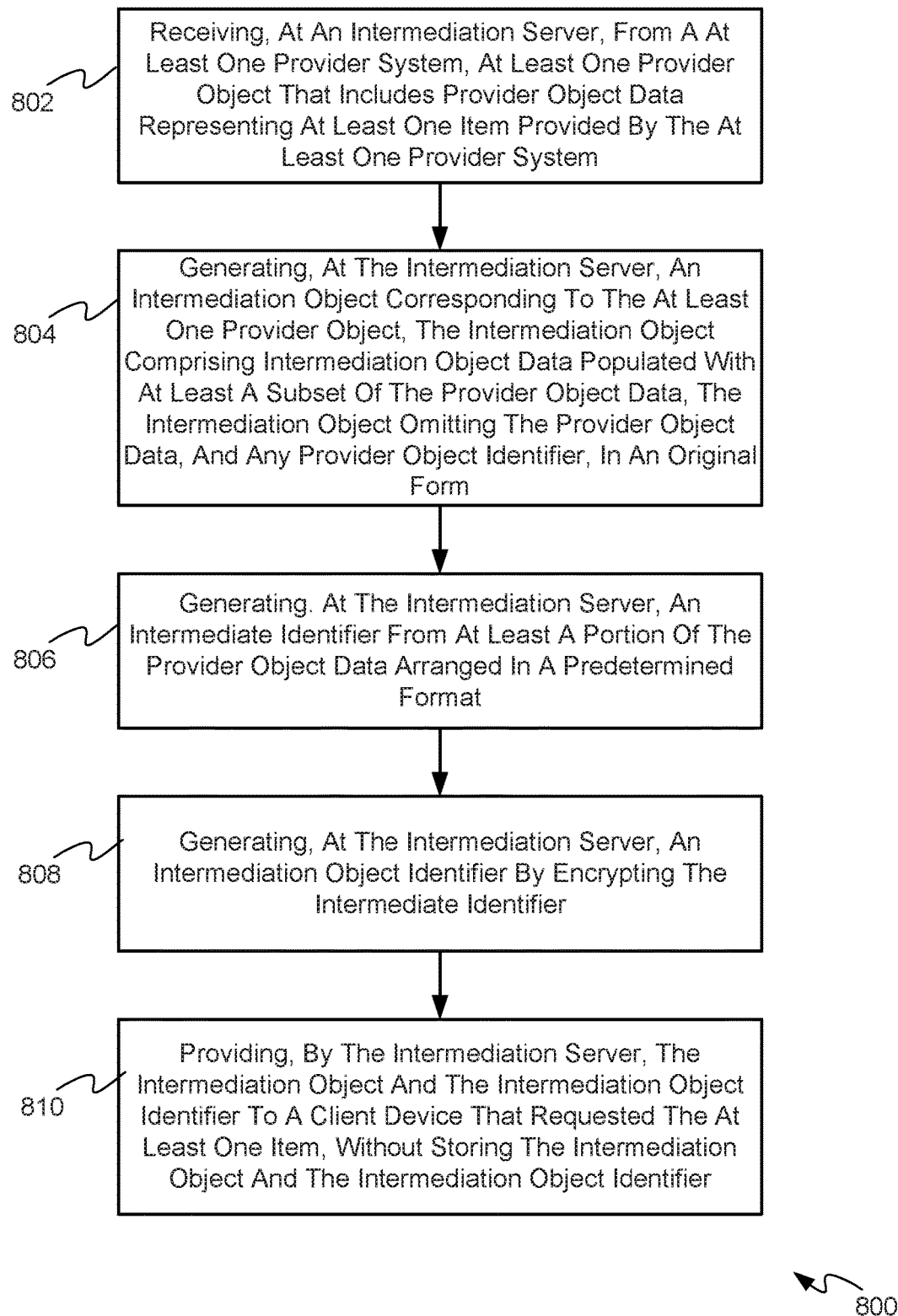
FIG. 8 depicts a method for intermediation between a provider system and a client device using intermediation object identifiers that are not stored by an intermediation server.
Figure 9:
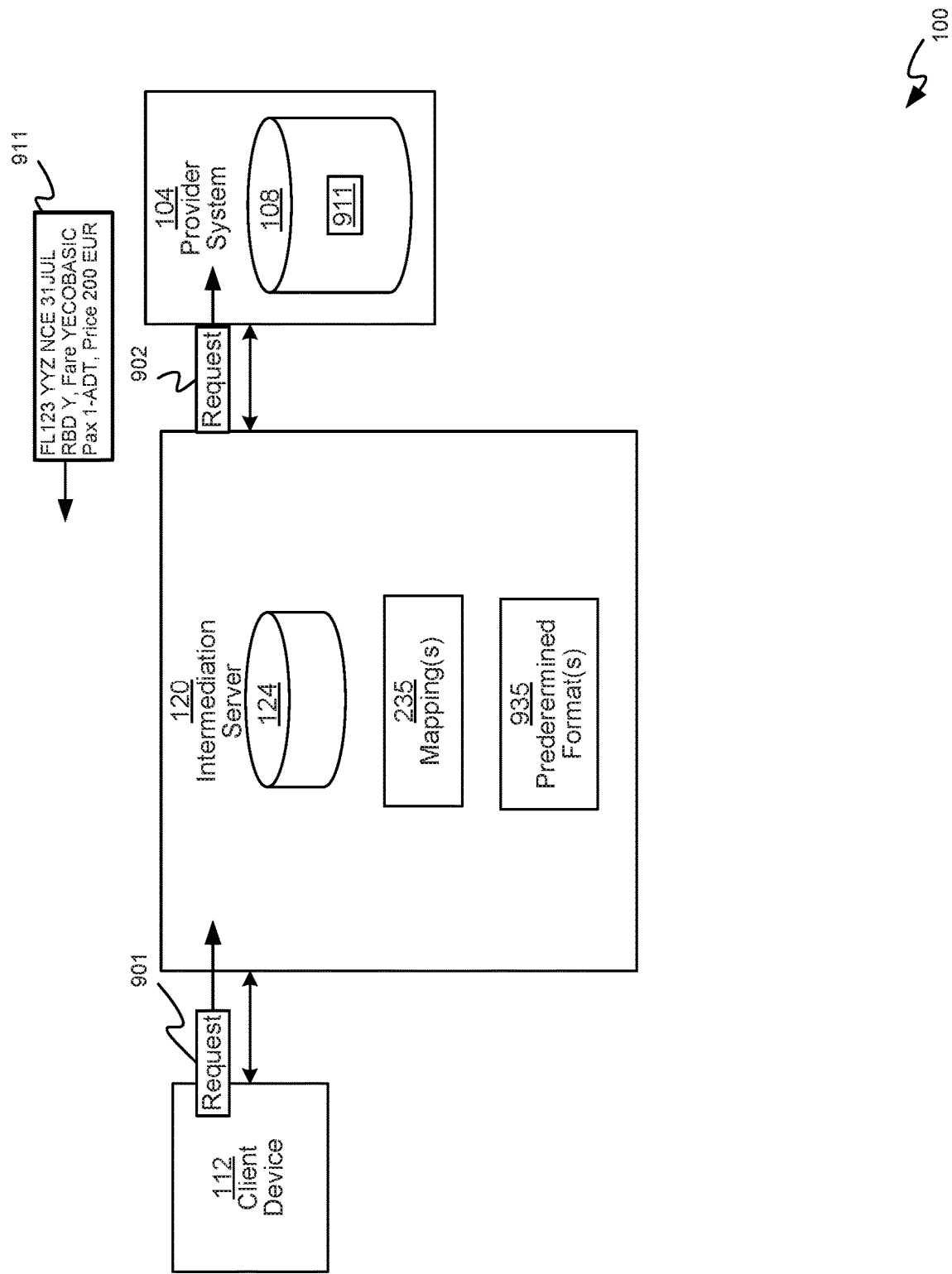
FIG. 9 depicts an example of a method used to generate an intermediation object and an intermediation object identifier, according to non-limiting examples.

Hence, attention is next directed to FIG. 8 which depicts a flowchart representative of a method 800 for intermediation between a provider system and a client device intermediation object identifiers that are not stored by the intermediation server. The operations of the method 800 of FIG. 8 correspond to machine readable instructions that are executed by the intermediation server 120, and specifically the controller 220 of the intermediation server 120. In the illustrated example, the instructions represented by the blocks of FIG. 8 are stored at the memory 222 for example, as the application 223 and/or a module of the application 223. The method 800 of FIG. 8 is one way in which the controller 220 and/or the intermediation server 120 and/or the system 100 may be configured. Indeed, the method 800 may represent another mode of the intermediation server 120 different from a mode represented by the method 300. Furthermore, the following discussion of the method 800 of FIG. 8 will lead to a further understanding of the system 100, and its various components.

The method 800 of FIG. 8 need not be performed in the exact sequence as shown and likewise various blocks may be performed in parallel rather than in sequence. Accordingly, the elements of method 800 are referred to herein as "blocks" rather than "steps." The method 800 of FIG. 8 may be implemented on variations of the system 100 of FIG. 1, as well.

At a block 802, the controller 220 and/or the intermediation server 120 receives (e.g. via the communication interface 228), from at least one provider system 104, at least one provider object that includes provider object data representing at least one item provided by at least one provider system 104. The block 802 is generally similar to the block 302 of the method 300.

At a block 804, the controller 220 and/or the intermediation server 120 generates an intermediation object corresponding to the at least one provider object, the intermediation object comprising intermediation object data populated with at least a subset of the provider object data, the intermediation object omitting the provider object data, and any provider object identifier, in an original form. The block 804 is generally similar to the intermediation object aspects of the block 304 of the method 300 and may be based on the mappings 235, and the like, as previously described. Generation of an intermediation object identifier in this mode is next described.

At a block 806, the controller 220 and/or the intermediation server 120 generates an intermediate identifier from at least a portion of the provider object data arranged in a predetermined format. Hence the intermediate identifier includes data that may enable the intermediation server 120 to identify, to the provider system 104, the provider object received at the block 802. The portion of the provider object data that forms the intermediate identifier may the same as, or different from, the subset of the provider object data used to generate the intermediation object data at the block 804. In general, the portion of the provider object data that is used to generate the intermediate identifier generally enables the intermediation server 120 to identify the provider object; for example, when the provider object data includes a provider object identifier (as with an NDC offer), the intermediate identifier generally includes at least the provider object identifier. In some examples, the intermediate identifier may include all the provider object data.

In some examples, the controller 220 and/or the intermediation server 120 may generate the intermediate identifier from at least the portion of the provider object data arranged in a predetermined format by: one or more of one or more of concatenating, assembling, grouping, and organizing the at least the portion of the provider object data according to the predetermined format. In particular, the provider object data may be concatenated together in a particular order defined by the predetermined format, as described below in more detail with respect to FIG. 10.

Furthermore, more than one predetermined format may be used to generate an intermediate identifier. For example, the predetermined format may be dependent on a type of the provider object; in particular, one predetermined format may be used for NDC offers and another format may be used for Edifact recommendations. Indeed, a different predetermined format may be used for different types of NDC offers and/or different types of Edifact recommendations and/or different provider systems 104. To indicate which predetermined format is being used to generate an intermediate identifier, the controller 220 and/or the intermediation server 120 may generate the intermediate identifier from at least the portion of the provider object data arranged in a predetermined format by: including, in the intermediate identifier, a predetermined format identifier with the portion of the provider object data arranged in the predetermined format. The predetermined format identifier may in form of alphanumeric text associated with a respective predetermined format. Indeed, the application 223 may store both the predetermined format identifiers and the predetermined formats and/or the memory 222 may separately store the predetermined format identifiers and the predetermined formats, for example in association with each other.

At a block 808, the controller 220 and/or the intermediation server 120 generates an intermediation object identifier by encrypting the intermediate identifier. For example, the encrypting may occur in any suitable manner and it is understood that the intermediation server 120 has been provisioned with suitable cryptographic keys (e.g. at the memory 222) and/or cryptographic algorithms for encrypting, and decrypting, the intermediate identifier. Such cryptographic keys may be symmetric or asymmetric. Furthermore, different cryptographic keys may be used for different provider objects and/or for different provider systems 104 (e.g. the intermediation server 120 may be provisioned with respective cryptographic keys for NDC offers, Edifact recommendations, and/or different respective cryptographic keys for different provider systems 104).

In some examples, the controller 220 and/or the intermediation server 120 may generate the intermediation object identifier by including an encryption version identifier with the intermediate identifier after encryption. For example, an alphanumeric identifier which generally identifies, to the intermediation server 120, the cryptographic keys and/or cryptographic algorithm used to encrypt (and/or decrypt) the encrypted intermediate identifier, may be concatenated and the like, to the encrypted intermediate identifier. Such an encryption version identifier does not explicitly indicate, however, the cryptographic keys and/or cryptographic algorithm used to encrypt (and/or decrypt) the encrypted intermediate identifier; rather, such an encryption version identifier may be stored at the memory 222 in association with the cryptographic keys and/or cryptographic algorithm used to encrypt (and/or decrypt) the encrypted intermediate identifier. Put another way, the encryption version identifier does not enable the client device 112 to decrypt the encrypted intermediate identifier.

Furthermore, the intermediation object identifier may be used to populate a field of the intermediation object such that the intermediation object comprises the intermediation object identifier, as described below with respect to FIG. 11.

At a block 810, the controller 220 and/or the intermediation server 120 provides (e.g. via the communication interface 228) the intermediation object with the intermediation object identifier to a client device 112 that requested the at least one item, and without storing the intermediation object and the intermediation object identifier. The block 810 is generally similar to the block 306 of the method 300, however the intermediation object and the intermediation object identifier are not stored; neither is the provider object stored; neither is any provider object identifier stored.

Hence, when the client device 112 receives the intermediation object and later requests further information associated with the at least one item provided by the provider system, the client device 112 may transmit the intermediation object identifier (and optionally the intermediation object) to the intermediation server 120, which may then decrypt the intermediation object identifier to obtain the intermediate identifier and the portion of the provider object data used to generate the intermediate identifier. The portion of the provider object data may be used by the intermediation server 120 to request the further information from the provider system.

Put another way, the controller 220 and/or the intermediation server 120 may be further configured to: receive (e.g. via the communication interface 228), from the client device 112, in response to providing the intermediation object, the intermediation object identifier with a request for further information associated with the at least one item (e.g. represented by the provider object received at the block 802); decrypt the intermediation object identifier to obtain the at least the portion of the provider object data; and request the further information from the provider system 104 using the at least the portion of the provider object data as decrypted.

Attention is next directed to FIG. 9, FIG. 10, FIG. 11 and FIG. 12 which depict an example of the method 800, when used to generate an intermediation object and an intermediation object identifier, based on a provider object that comprises an Edifact recommendation. With attention first directed to FIG. 9, the intermediation server 120 may receive, from the client device 112, a request 901 for at least one item provided by the provider system 104, and the intermediation server 120 may transmit, to the provider system 104, a request 902 for provider objects that represent the items defined by the request 901. The requests 901, 902 are hence respectively similar to the requests 401, 402 of FIG. 4.

As depicted, the intermediation server 120 receives (e.g. at the block 802 of the method 800), from the provider system 104, in response to transmitting the request 902, a provider object 911. As depicted, the provider object 911 is similar to the provider object 611-2, and hence the provider object 911 may comprise an Edifact recommendation. As depicted, the intermediation server 120 further stores one or more predetermined formats 935 for generating an intermediate identifier and an intermediation object identifier as next described. As depicted, the provider object 911 is further stored at the repository 108 of the provider system 104.

Figure 10:
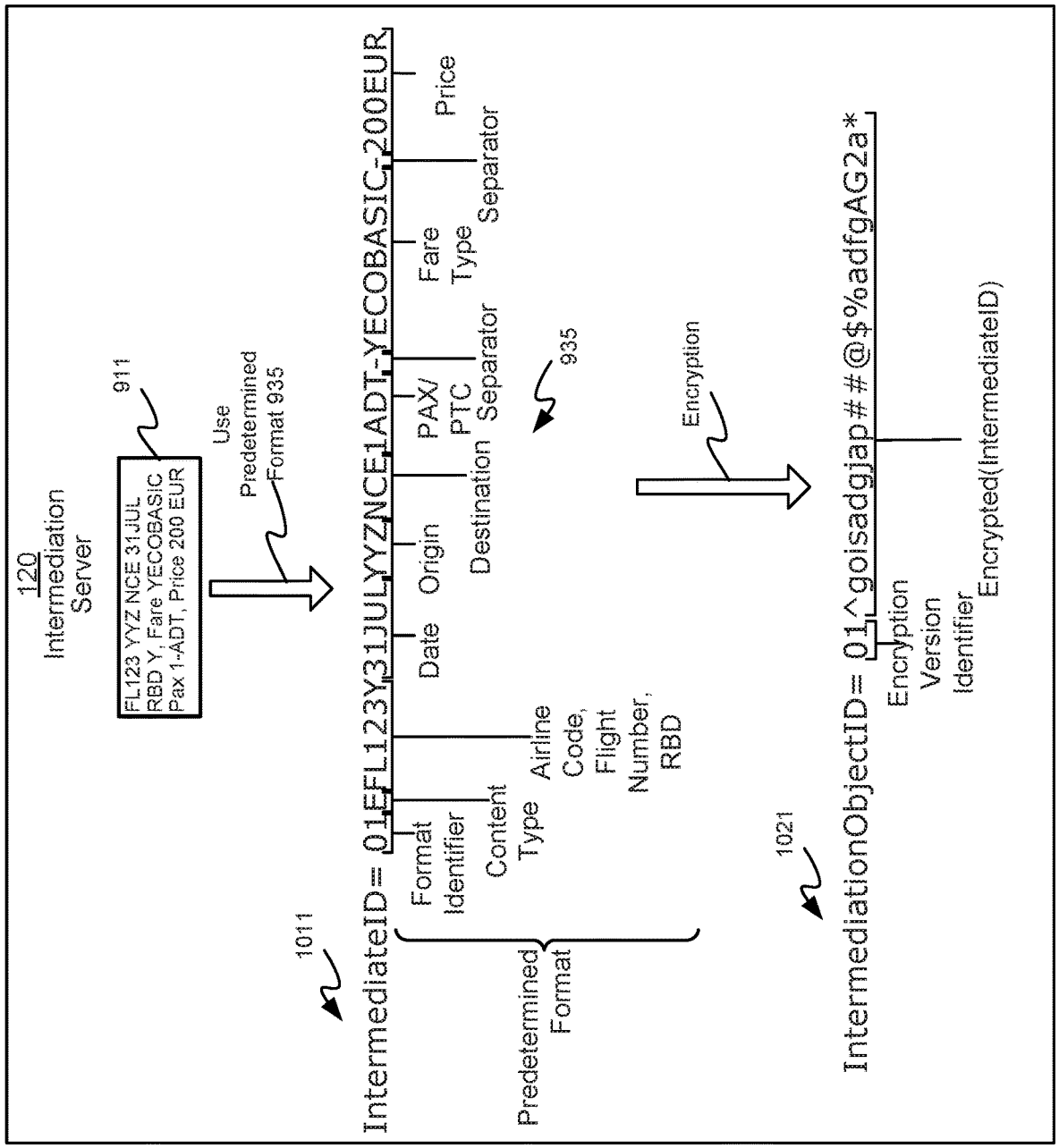
FIG. 10 depicts an example of a method used to generate an intermediation object and an intermediation object identifier, according to non-limiting examples.

Attention is next directed to FIG. 10 which depicts the intermediation server 120 generating an intermediation object identifier according to the method 800. While generation of an intermediation object is not described in detail in this example, it is understood that the intermediation server 120 generates (e.g. at the block 804 of the method 800) an intermediation object from the provider object 911, as described above with respect to FIG. 6.

As depicted in FIG. 10, the intermediation server 120 generates (e.g. at the block 806 of the method 800) an intermediate identifier 1011 from at least a portion of the provider object data of the provider object 911, arranged in a predetermined format 935, for example a predetermined format for an Edifact recommendation. Indeed, the predetermined format 935 may comprise a mapping between provider object data of the provider object 911 and text positions of the intermediate identifier 1011. For example, as depicted, the predetermined format 935 indicates that the intermediate identifier 1011 is populated by including a predetermined format identifier (e.g. "01") in a first text position, and a content type identifier (e.g. "E") in a second text position, and concatenating at least a portion of the provider object data of the provider object 911 to the format identifier. As depicted, the intermediate identifier 1011 comprises, in order:

A format identifier indicates which of a plurality of predetermined formats 935 has been selected to generate the intermediate identifier 1011.

A content type of the provider object 911; as depicted the content type ("E") indicates that the provider object 911 comprises an Edifact recommendation, though other content types may be indicated using other alphanumeric text (e.g. E=Edifact, L=Low Cost, H=Hotel, N=NDC Offer, M=Mixed NDC/Edifact, etc.).

An Airline Code, a Flight Number and an RBD (e.g. "FL123Y") from the provider object data of the provider object 911.

An Origin (e.g. "YYZ") from the provider object data of the provider object 911.

A Destination (e.g. "NCE") from the provider object data of the provider object 911.

A Number of Persons and a Passenger Type Code (PTC) (e.g. "1ADT"=1 Adult) from the provider object data of the provider object 911.

An Optional Separator (e.g. "-" not present in the provider object data of the provider object 911).

A Fare Type (e.g. "YECOBASIC") from the provider object data of the provider object 911.

Another Optional Separator (e.g. "-" not present in the provider object data of the provider object 911).

A Price (e.g. "200EUR") from the provider object data of the provider object 911.

However, while a specific predetermined format 935 is depicted, any suitable predetermined format 935 is within the scope of the present specification. For example, the depicted provider object data, predetermined format identifier and/or content type may be arranged in any suitable manner and/or any suitable order including, but not limited to, interspersing text from different fields of provider object 911. Furthermore, while the specific predetermined format 935 indicates concatenating provider object data, a predetermined format 935 may indicate any suitable assembling, grouping, and organizing of the provider object data.

As depicted, the intermediation server 120 generates (e.g. at the block 808 of the method 800) an intermediation object identifier 1021 by encrypting the intermediate identifier 1011 using any suitable cryptographic key and cryptographic algorithms. The intermediation server 120 further adds an encryption version identifier (e.g. "01") to the encrypted intermediate identifier (e.g. ˆgoisadgjap##@$%adfgAG2a*) to indicate which cryptographic key and cryptographic algorithms were used to the encrypt intermediate identifier 1011.

Figure 11:
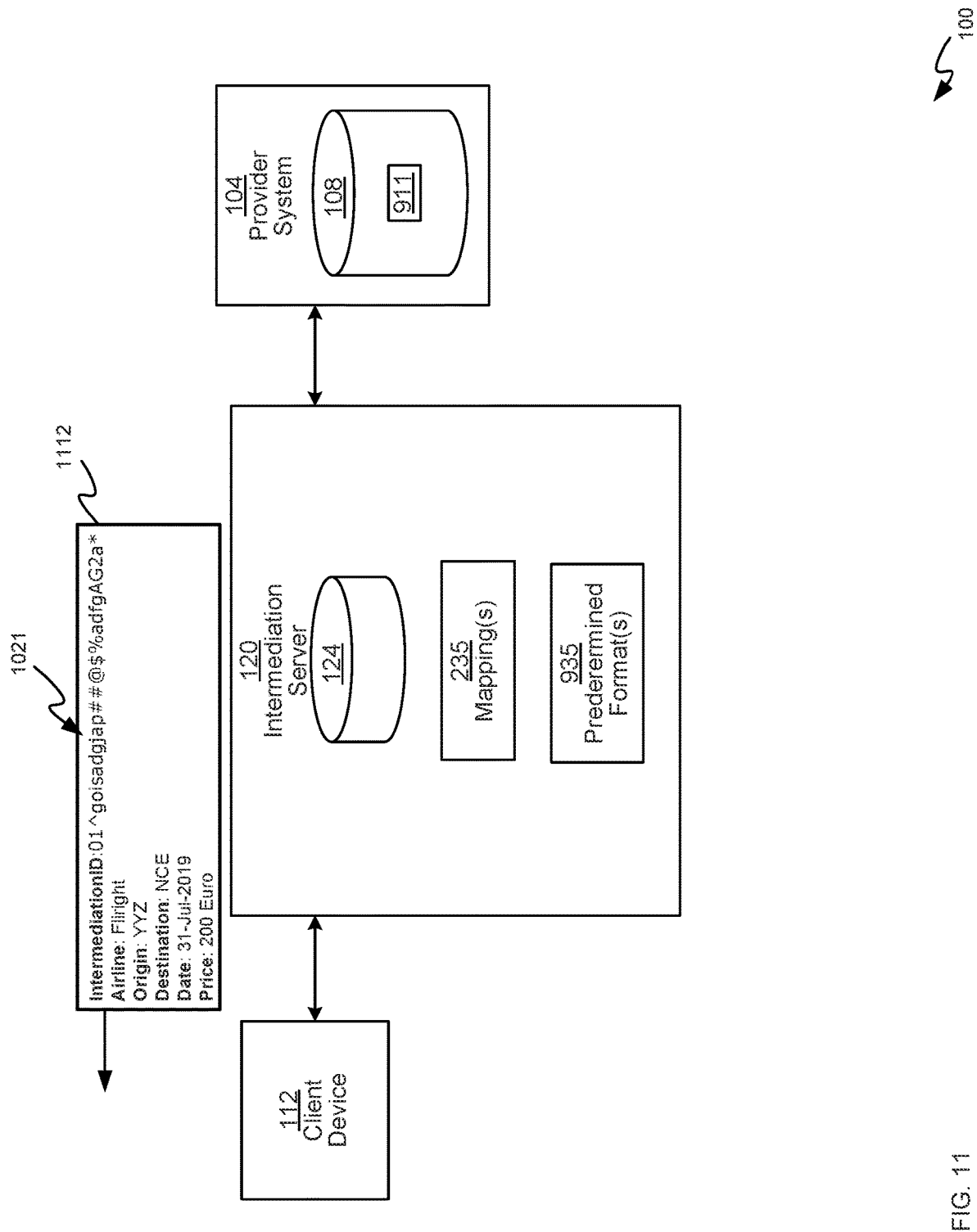
FIG. 11 depicts an example of a method used to generate an intermediation object and an intermediation object identifier, according to non-limiting examples.

Attention is next directed to FIG. 11 which depicts the intermediation server 120 providing (e.g. at the block 810 of the method 800) an intermediation object 1112 (e.g. as generated at the block 804) to the client device 112, in response to receiving the request 901. As depicted, the intermediation object 1112 is similar to the intermediation object 612-2 but includes the intermediation object identifier 1021. In particular, neither the intermediation object 1112, the intermediation object identifier 1021, or the provider object 911 is stored at the repository 124.

Figure 12:
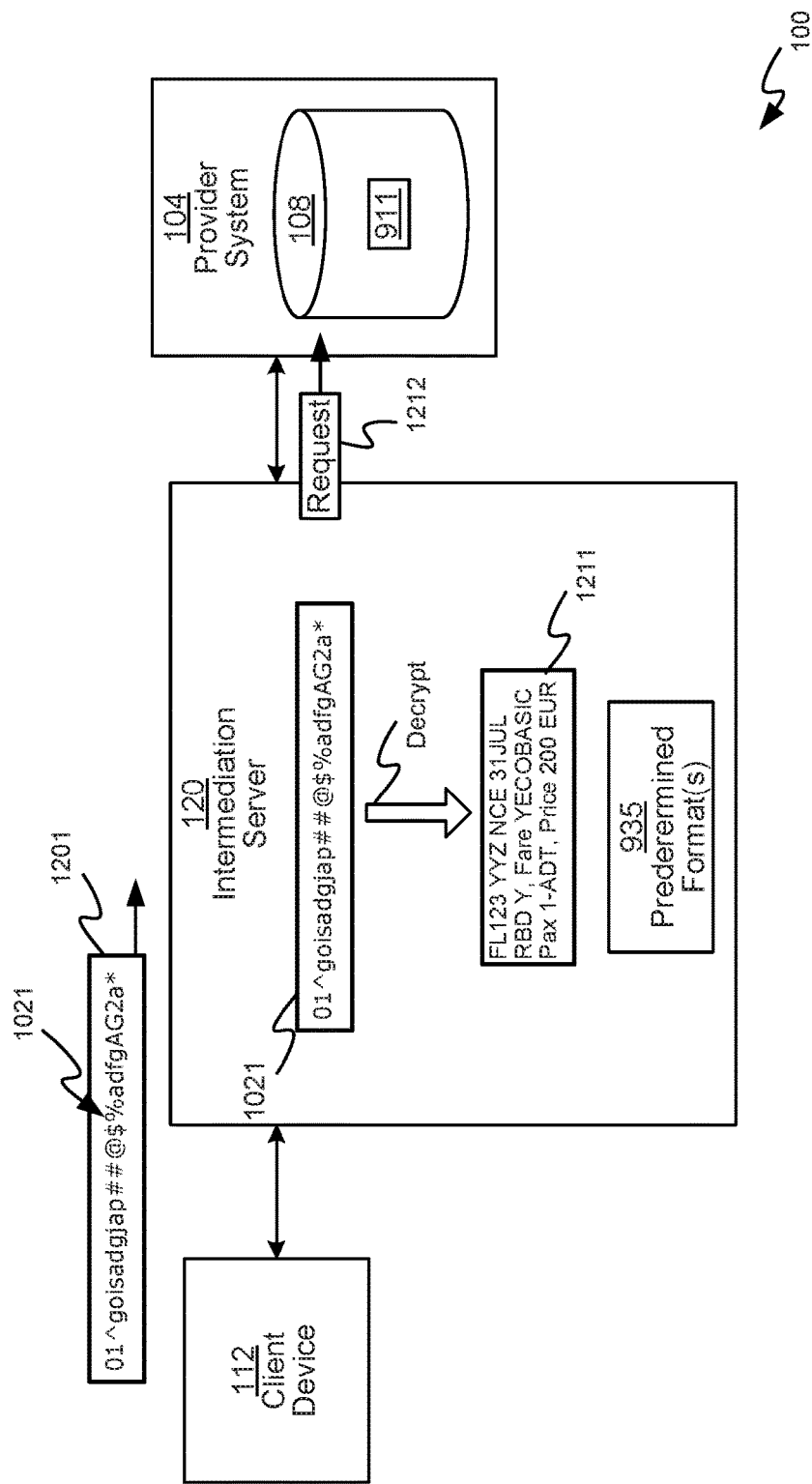
FIG. 12 depicts an example of a method used to generate an intermediation object and an intermediation object identifier, according to non-limiting examples.

Attention is next directed to FIG. 12 which depicts the intermediation server 120 receiving, from the client device 112, a request 1201 for further information associated with the at least one item represented by the provider object 911 and/or the intermediation object 1112. Put another way, a user of the client device 112 may have reviewed the information of the intermediation object 1112 and operated the client device 112 to generate the request 1201, for example to request a final price (e.g. 200 Euros may be an estimated price and/or a published price) and/or finalized information for the item (e.g. such as a time etc., for a flight) represented by the provider object 911 and/or the intermediation object 1112 and/or to order (and/or book and/or purchase) the item. While the request 1201 may include other information (e.g. from the intermediation object 1112 and/or indicators of what further information is being requested), as depicted the request 1201 includes the intermediation object identifier 1021.

As depicted, while the intermediation server 120 has not stored the intermediation object 1112, the intermediation object identifier 1021, nor the provider object 911, the intermediation server 120 may obtain the information embedded in the intermediation object identifier 1021 by decrypting the intermediation object identifier 1021 using, for example cryptographic keys and/or a cryptographic algorithm indicated by the encryption version identifier (e.g. "01") of the intermediation object identifier 1021. Indeed, from the predetermined format 935 indicated by the format identifier of the information embedded in the intermediation object identifier 1021, the intermediation server 120 may obtain and/or reconstruct the portion of the provider object data of the provider object 911; for example, as depicted, the intermediation server 120 generates at least a partially reconstructed provider object 1211 (e.g. which, as depicted, is similar to the provider object 911). The intermediation server 120 may then transmit a request 1212 for the further information requested by the client device 112 to the provider system 104 using, for example, at least a portion of the reconstructed provider object 1211 in the request.

Figure 13:
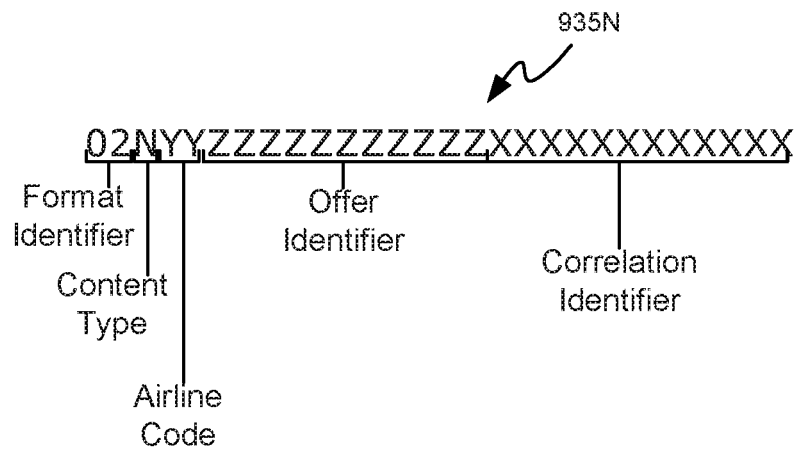
FIG. 13 depicts a predetermined format for generating an intermediate identifier, according to non-limiting examples.

While the method 800 has been described with respect to an Edifact recommendation and a predetermined format 935 therefor, other predetermined formats may be used for other types of provider objects. For example, attention is next directed to FIG. 13 which depicts a predetermined format 935N for generating an intermediate identifier based on at least a portion of a provider object that comprises an NDC offer. For example, the predetermined format 935N comprises a predetermined format identifier (e.g. "02", indicative of the structure of the predetermined format 935N, similar to the format identifier described with respect to FIG. 10), a content type (e.g. "N" indicating that the content of an intermediate identifier generated from the predetermined format 935N is for an NDC offer), an offer identifier (e.g. an NDC offer identifier, such as a ProviderOfferID), and a correlation identifier (e.g. an identifier transaction associated with a user of the client device 112). While other fields of an NDC offer are not included in the depicted predetermined format 935N, in other examples fields such a price, airline code, origin, destination, etc. may be included in the predetermined format 935N. In the depicted example, an offer identifier embedded in an intermediate identifier generated from the predetermined format 935N may be used to identify an associate provider object to a provider system 104.

In this specification, elements may be described as "configured to" perform one or more functions or "configured for" such functions. In general, an element that is configured to perform or configured for performing a function is enabled to perform the function, or is suitable for performing the function, or is adapted to perform the function, or is operable to perform the function, or is otherwise capable of performing the function.

It is understood that for the purpose of this specification, language of "at least one of X, Y, and Z" and "one or more of X, Y and Z" can be construed as X only, Y only, Z only, or any combination of two or more items X, Y, and Z (e.g., XYZ, XY, YZ, XZ, and the like). Similar logic can be applied for two or more items in any occurrence of "at least one . . . " and "one or more . . . " language.

The terms "about", "substantially", "essentially", "approximately", and the like, are defined as being "close to", for example as understood by persons of skill in the art. In some examples, the terms are understood to be "within 10%," in other examples, "within 5%", in yet further examples, "within 1%", and in yet further examples "within 0.5%".

Persons skilled in the art will appreciate that in some examples, the functionality of devices and/or methods and/or processes described herein can be implemented using pre-programmed hardware or firmware elements (e.g., application specific integrated circuits (ASICs), electrically erasable programmable read-only memories (EEPROMs), etc.), or other related components. In other examples, the functionality of the devices and/or methods and/or processes described herein can be achieved using a computing apparatus that has access to a code memory (not shown) which stores computer-readable program code for operation of the computing apparatus. The computer-readable program code could be stored on a computer readable storage medium which is fixed, tangible and readable directly by these components, (e.g., removable diskette, CD-ROM, ROM, fixed disk, USB drive). Furthermore, it is appreciated that the computer-readable program can be stored as a computer program product comprising a computer usable medium. Further, a persistent storage device can comprise the computer readable program code. It is yet further appreciated that the computer-readable program code and/or computer usable medium can comprise a non-transitory computer-readable program code and/or non-transitory computer usable medium. Alternatively, the computer-readable program code could be stored remotely but transmittable to these components via a modem or other interface device connected to a network (including, without limitation, the Internet) over a transmission medium. The transmission medium can be either a non-mobile medium (e.g., optical and/or digital and/or analog communications lines) or a mobile medium (e.g., microwave, infrared, free-space optical or other transmission schemes) or a combination thereof.

Persons skilled in the art will appreciate that there are yet more alternative examples and modifications possible, and that the above examples are only illustrations of one or more examples. The scope, therefore, is only to be limited by the claims appended hereto.

What is claimed is:

1. A method comprising:
receiving, at an intermediation server, from at least one provider system, at least one provider object that includes provider object data representing at least one item provided by the at least one provider system;

generating, at the intermediation server, an intermediation object corresponding to the at least one provider object, the intermediation object including intermediation object data and an intermediation object identifier that identifies the intermediation object, the intermediation object data populated with at least a subset of the provider object data based on a mapping between the intermediation object data and the provider object data, the intermediation object and the intermediation object identifier omitting: the provider object data, and any provider object identifier in an original form; and providing, by the intermediation server, the intermediation object to a client device that requested the at least one item provided by the at least one provider system, the intermediation object provided in place of the at least one provider object, wherein the generating the intermediation object comprises restructuring at least a portion of the subset of the provider object data according to the mapping, the restructuring impeding an ability of the client device from communicating with the provider system directly regarding the at least one provider object.

2. The method of claim 1, further comprising:
storing, at one or more memories, one or more of the intermediation object and the intermediation object identifier in association with one or more of the at least one provider object and the provider object identifier.

3. The method of claim 1, further comprising:
receiving, at the intermediation server, a plurality of provider objects,
wherein the intermediation object data is populated with at least a subset of respective provider object data of the plurality of provider objects based on one or more mappings between the intermediation object data and the respective provider object data, the intermediation object and the intermediation object identifier omitting: the respective provider object data, including any respective provider object identifiers, in a respective original form.

4. The method of claim 1, further comprising:
receiving, at the intermediation server, from the client device, a request including the intermediation object identifier; and
requesting, from the at least one provider system, further information associated with the at least one item, based on one or more of:
at least one of the intermediation object and the intermediation object identifier stored, at one or memories, in association with one or more of the at least one provider object and the provider object identifier; and
an encrypted version of a portion the at least one provider object included at the intermediation object.

5. The method of claim 1, wherein the at least one provider object comprises a New Distribution Capability (NDC) offer or an Edifact recommendation.

6. The method of claim 1, wherein the at least one provider object comprises one or more of a provider offer item and a provider service item representing a plurality of items provided by the at least one provider system, and the intermediation object comprises one or more of an intermediation offer item and an intermediation service item respectively corresponding to one or more of the provider offer item and the provider service item.

7. A server comprising:
a communication interface; and
a controller configured to:
receive, via the communication interface, from at least one provider system, at least one provider object that includes provider object data representing at least one item provided by the at least one provider system;
generate an intermediation object corresponding to the at least one provider object, the intermediation object comprising intermediation object data populated with at least a subset of the provider object data, the intermediation object omitting the provider object data, and any provider object identifier, in an original form;
generate an intermediate identifier from at least a portion of the provider object data arranged in a predetermined format;
generate an intermediation object identifier by encrypting the intermediate identifier; and
provide the intermediation object and the intermediation object identifier to a client device that requested the at least one item, without storing the intermediation object and the intermediation object identifier,
wherein the generating the intermediation object comprises restructuring at least a portion of the subset of the provider object data according to the mapping, the restructuring impeding an ability of the client device from communicating with the provider system directly regarding the at least one provider object.

8. The server of claim 7, wherein the controller is further configured to:
receive, via the communication interface, from the client device, in response to providing the intermediation object, the intermediation object identifier with a request for further information associated with the at least one item;
decrypt the intermediation object identifier to obtain the at least the portion of the provider object data; and
request the further information from the at least one provider system using the at least the portion of the provider object data as decrypted.

9. The server of claim 7, wherein the controller is further configured to generate the intermediate identifier from at least the portion of the provider object data arranged in a predetermined format by:
one or more of concatenating, assembling, grouping, and organizing the at least the portion of the provider object data according to the predetermined format.

10. The server of claim 7, wherein the controller is further configured to generate the intermediate identifier from at least the portion of the provider object data arranged in a predetermined format by:
including, a predetermined format identifier with the portion of the provider object data arranged in the predetermined format.

11. The server of claim 7, wherein the controller is further configured to generate the intermediation object identifier by including an encryption version identifier with the intermediate identifier after encryption.

12. The server of claim 7, wherein the predetermined format is dependent on a type of the provider object.

13. The server of claim 7, wherein the intermediation object comprises the intermediation object identifier.

14. The server of claim 7, wherein the at least one provider object comprises a New Distribution Capability (NDC) offer or an Edifact recommendation.

15. A non-transitory computer-readable medium storing a computer program, wherein execution of the computer program is for:
receiving, at an intermediation server, from at least one provider system, at least one provider object that includes provider object data representing at least one item provided by the at least one provider system;
generating, at the intermediation server, an intermediation object corresponding to the at least one provider object, the intermediation object including intermediation object data and an intermediation object identifier that identifies the intermediation object, the intermediation object data populated with at least a subset of the provider object data based on a mapping between the intermediation object data and the provider object data, the intermediation object and the intermediation object identifier omitting: the provider object data, and any provider object identifier in an original form; and
providing, by the intermediation server, the intermediation object to a client device that requested the at least one item provided by the at least one provider system, the intermediation object provided in place of the at least one provider object,
wherein the generating the intermediation object comprises restructuring at least a portion of the subset of the provider object data according to the mapping, the restructuring impeding an ability of the client device from communicating with the provider system directly regarding the at least one provider object.

16. The non-transitory computer-readable medium of claim 15, wherein execution of the computer program is further for:
storing, at one or more memories, one or more of the intermediation object and the intermediation object identifier in association with one or more of the at least one provider object and the provider object identifier.

17. The non-transitory computer-readable medium of claim 15, wherein execution of the computer program is further for:
receiving, at the intermediation server, a plurality of provider objects,
wherein the intermediation object data is populated with at least a subset of respective provider object data of the plurality of provider objects based on one or more mappings between the intermediation object data and the respective provider object data, the intermediation object and the intermediation object identifier omitting: the respective provider object data, including any respective provider object identifiers, in a respective original form.

18. The non-transitory computer-readable medium of claim 15, wherein execution of the computer program is further for:
receiving, at the intermediation server, from the client device, a request including the intermediation object identifier; and
requesting, from the at least one provider system, further information associated with the at least one item, based on one or more of:
at least one of the intermediation object and the intermediation object identifier stored, at one or memories, in association with one or more of the at least one provider object and the provider object identifier; and
an encrypted version of a portion the at least one provider object included at the intermediation object requesting, by the intermediation server, from the provider system, the at least one provider object based on one or more of: the request received from the client device; and the intermediation object identifier; and
receiving, at the intermediation server, from the provider system, the at least one provider object.

19. The non-transitory computer-readable medium of claim 15, wherein the at least one provider object comprises a New Distribution Capability (NDC) offer or an Edifact recommendation.

* * * * *